United States Patent
Narasimhan et al.

(10) Patent No.: US 8,249,062 B1
(45) Date of Patent: *Aug. 21, 2012

(54) SCALABLE ARCHITECTURE FOR TRANSMISSION OF MESSAGES OVER A NETWORK

(75) Inventors: Anand Narasimhan, Beverly Hills, CA (US); Yaacov Shemesh, Los Angeles, CA (US); Amit Kumar, Los Angeles, CA (US)

(73) Assignee: j2 Global Communications, Inc., Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/825,031

(22) Filed: Jun. 28, 2010

Related U.S. Application Data

(63) Continuation of application No. 11/341,408, filed on Jan. 26, 2006, now Pat. No. 7,769,001, which is a continuation of application No. 10/393,227, filed on Mar. 20, 2003, now Pat. No. 7,020,132, which is a continuation of application No. 09/097,307, filed on Jun. 12, 1998, now Pat. No. 6,597,688.

(51) Int. Cl.
*H04L 12/66* (2006.01)

(52) U.S. Cl. .................................................. 370/356

(58) Field of Classification Search ........... 370/352–356
See application file for complete search history.

(56) References Cited

U.S. PATENT DOCUMENTS

| | | | |
|---|---|---|---|
| 4,130,885 A | 12/1978 | Dennis | |
| 4,571,699 A | 2/1986 | Herzog et al. | |
| 4,837,798 A | 6/1989 | Cohen et al. | |
| 4,941,170 A | 7/1990 | Herbst | |
| 5,018,191 A | 5/1991 | Catron et al. | |
| 5,029,199 A | 7/1991 | Jones et al. | |
| 5,047,918 A | 9/1991 | Schwartz et al. | |
| 5,054,096 A | 10/1991 | Beizer | |
| 5,068,797 A | 11/1991 | Sansone et al. | |
| 5,113,430 A | 5/1992 | Richardson et al. | |
| 5,115,326 A | 5/1992 | Burgess et al. | |
| 5,127,003 A | 6/1992 | Doll, Jr. et al. | |
| 5,129,080 A | 7/1992 | Smith | |
| 5,193,110 A | 3/1993 | Jones et al. | |
| 5,195,085 A | 3/1993 | Bertsch et al. | |
| 5,210,824 A | 5/1993 | Putz et al. | |
| 5,224,156 A | 6/1993 | Fuller et al. | |

(Continued)

FOREIGN PATENT DOCUMENTS

AU  755321  12/2002

(Continued)

OTHER PUBLICATIONS jFax Personal telecom, http:://www.jfax.net/, Dec. 4, 1994 4:57 p.m. (pp. 1-2); and www.jfax.net/software,htm, Dec. 4, 1996 5:22p.m., (pp. 1-2).

(Continued)

*Primary Examiner* — Thai Hoang
(74) *Attorney, Agent, or Firm* — Blakely, Sokoloff, Taylor & Zafman LLP

(57) ABSTRACT

A method and apparatus is disclosed for delivering messages that utilizes a message queue and a router/filter within a private data network. The private network is connected to an external data network such as the Internet, and has separate outbound resource servers to provide a high degree of scalability for handling a variety of message types.

15 Claims, 8 Drawing Sheets

U.S. PATENT DOCUMENTS

| | | |
|---|---|---|
| 5,227,893 A | 7/1993 | Ett |
| 5,267,047 A | 11/1993 | Argenta et al. |
| 5,267,301 A | 11/1993 | Nishii |
| 5,289,371 A | 2/1994 | Abel et al. |
| 5,291,302 A | 3/1994 | Gordon et al. |
| 5,291,546 A | 3/1994 | Giler et al. |
| 5,296,934 A | 3/1994 | Ohtsuki |
| 5,299,255 A | 3/1994 | Iwaki et al. |
| 5,301,226 A | 4/1994 | Olson et al. |
| 5,307,456 A | 4/1994 | MacKay |
| 5,333,266 A | 7/1994 | Boaz et al. |
| 5,339,156 A | 8/1994 | Ishii |
| 5,351,276 A | 9/1994 | Doll, Jr. et al. |
| 5,371,885 A | 12/1994 | Letwin |
| 5,384,835 A | 1/1995 | Wheeler et al. |
| 5,394,460 A | 2/1995 | Olson et al. |
| 5,394,522 A | 2/1995 | Sanchez-Frank et al. |
| 5,406,557 A | 4/1995 | Baudoin |
| 5,438,433 A | 8/1995 | Reifman et al. |
| 5,448,626 A | 9/1995 | Kajiya et al. |
| 5,452,289 A | 9/1995 | Sharma et al. |
| 5,475,738 A | 12/1995 | Penzias |
| 5,479,411 A | 12/1995 | Klein |
| 5,487,100 A | 1/1996 | Kane |
| 5,488,651 A | 1/1996 | Giler et al. |
| 5,502,637 A | 3/1996 | Beaulieu et al. |
| 5,513,126 A | 4/1996 | Harkins et al. |
| 5,517,556 A | 5/1996 | Pounds et al. |
| 5,524,137 A | 6/1996 | Rhee |
| 5,530,740 A | 6/1996 | Irribarren et al. |
| 5,546,388 A | 8/1996 | Lin |
| 5,548,789 A | 8/1996 | Nakanura |
| 5,552,901 A | 9/1996 | Kikuchi et al. |
| 5,557,659 A | 9/1996 | Hyde-Thomson |
| 5,559,721 A | 9/1996 | Ishii |
| 5,561,703 A | 10/1996 | Arledge et al. |
| 5,568,536 A | 10/1996 | Tiller et al. |
| 5,568,540 A | 10/1996 | Greco et al. |
| 5,579,472 A | 11/1996 | Keyworth, II et al. |
| 5,590,178 A | 12/1996 | Murakami et al. |
| 5,604,788 A | 2/1997 | Tett |
| 5,608,446 A | 3/1997 | Carr et al. |
| 5,608,786 A | 3/1997 | Gordon |
| 5,608,874 A | 3/1997 | Ogawa et al. |
| 5,621,727 A | 4/1997 | Vaudreuil |
| 5,625,675 A | 4/1997 | Katsumaru et al. |
| 5,633,916 A | 5/1997 | Goldhagen et al. |
| 5,647,002 A | 7/1997 | Brunson |
| 5,654,957 A | 8/1997 | Koyama |
| 5,664,102 A | 9/1997 | Faynberg |
| 5,675,507 A | 10/1997 | Bobo, II |
| 5,687,220 A | 11/1997 | Finnigan |
| 5,689,550 A | 11/1997 | Garson et al. |
| 5,692,039 A | 11/1997 | Brankley et al. |
| 5,694,458 A | 12/1997 | Okada |
| 5,712,901 A | 1/1998 | Meermans |
| 5,712,903 A | 1/1998 | Bartholomew et al. |
| 5,712,907 A | 1/1998 | Wegner et al. |
| 5,715,314 A | 2/1998 | Payne et al. |
| 5,717,742 A | 2/1998 | Hyde-Thomson |
| 5,724,410 A | 3/1998 | Parvulescu et al. |
| 5,724,424 A | 3/1998 | Gifford |
| 5,724,514 A | 3/1998 | Arias |
| 5,732,219 A | 3/1998 | Blumer et al. |
| 5,737,395 A | 4/1998 | Irribarren |
| 5,737,533 A | 4/1998 | de Hond |
| 5,740,231 A | 4/1998 | Cohn et al. |
| 5,742,596 A | 4/1998 | Baratz et al. |
| 5,742,668 A | 4/1998 | Pepe et al. |
| 5,742,905 A | 4/1998 | Pepe et al. |
| 5,758,088 A | 5/1998 | Bezaire et al. |
| 5,761,201 A | 6/1998 | Vaudreuil |
| 5,761,396 A | 6/1998 | Austin et al. |
| 5,765,033 A | 6/1998 | Miloslavsky |
| 5,771,354 A | 6/1998 | Crawford |
| 5,805,298 A | 9/1998 | Ho et al. |
| 5,812,639 A | 9/1998 | Bartholomew et al. |
| 5,812,786 A | 9/1998 | Seazholtz et al. |
| 5,819,092 A | 10/1998 | Ferguson et al. |
| 5,825,865 A | 10/1998 | Oberlander et al. |
| 5,838,906 A | 11/1998 | Doyle et al. |
| 5,848,413 A | 12/1998 | Wolff |
| 5,859,967 A | 1/1999 | Kaufeld et al. |
| 5,870,454 A | 2/1999 | Dahlen |
| 5,872,926 A | 2/1999 | Levac et al. |
| 5,881,233 A | 3/1999 | Toyoda et al. |
| 5,892,591 A | 4/1999 | Anglin, Jr. et al. |
| 5,903,723 A | 5/1999 | Beck et al. |
| 5,907,598 A | 5/1999 | Mandalia et al. |
| 5,911,776 A | 6/1999 | Guck |
| 5,917,615 A | 6/1999 | Reifman et al. |
| 5,930,493 A | 7/1999 | Ottesen et al. |
| 5,933,490 A | 8/1999 | White et al. |
| 5,937,041 A | 8/1999 | Cardillo, IV et al. |
| 5,937,161 A | 8/1999 | Mulligan et al. |
| 5,937,162 A | 8/1999 | Funk et al. |
| 5,940,476 A | 8/1999 | Morganstein et al. |
| 5,940,598 A | 8/1999 | Strauss et al. |
| 5,944,786 A | 8/1999 | Quinn |
| 5,945,989 A | 8/1999 | Freishtat et al. |
| 5,946,386 A | 8/1999 | Rogers et al. |
| 5,958,016 A | 9/1999 | Chang et al. |
| 5,963,618 A | 10/1999 | Porter |
| 5,963,892 A | 10/1999 | Tanaka et al. |
| 5,970,490 A | 10/1999 | Morgenstern |
| 5,978,813 A | 11/1999 | Foltz et al. |
| 5,987,504 A | 11/1999 | Toga |
| 5,987,508 A | 11/1999 | Agraharam et al. |
| 5,991,292 A | 11/1999 | Focsaneanu et al. |
| 5,996,006 A | 11/1999 | Speicher |
| 5,999,525 A | 12/1999 | Krishnaswamy et al. |
| 5,999,594 A | 12/1999 | Mizoguchi et al. |
| 5,999,965 A | 12/1999 | Kelly |
| 6,009,469 A | 12/1999 | Mattaway et al. |
| 6,014,668 A | 1/2000 | Tabata et al. |
| 6,020,980 A | 2/2000 | Freeman |
| 6,023,700 A | 2/2000 | Owens et al. |
| 6,025,931 A | 2/2000 | Bloomfield |
| 6,052,367 A | 4/2000 | Bowater et al. |
| 6,061,448 A | 5/2000 | Smith et al. |
| 6,064,653 A | 5/2000 | Farris |
| 6,072,862 A | 6/2000 | Srinivasan |
| 6,073,165 A | 6/2000 | Narasimhan et al. |
| 6,084,892 A | 7/2000 | Benash et al. |
| 6,085,101 A | 7/2000 | Jain et al. |
| 6,097,797 A | 8/2000 | Oseto |
| 6,108,329 A | 8/2000 | Oyama et al. |
| 6,157,706 A | 12/2000 | Rachelson |
| 6,181,781 B1 | 1/2001 | Porter et al. |
| 6,185,603 B1 | 2/2001 | Henderson et al. |
| 6,208,638 B1 | 3/2001 | Rieley et al. |
| 6,211,972 B1 | 4/2001 | Okutomi et al. |
| 6,212,550 B1 | 4/2001 | Segur |
| 6,215,858 B1 | 4/2001 | Bartholomew et al. |
| 6,216,173 B1 | 4/2001 | Jones et al. |
| 6,240,445 B1 | 5/2001 | Kumar et al. |
| 6,246,983 B1 | 6/2001 | Zou et al. |
| 6,256,115 B1 | 7/2001 | Adler et al. |
| 6,259,533 B1 | 7/2001 | Toyoda et al. |
| 6,263,064 B1 | 7/2001 | O'Neal et al. |
| 6,278,532 B1 | 8/2001 | Heimendinger et al. |
| 6,282,270 B1 | 8/2001 | Porter |
| 6,288,799 B1 | 9/2001 | Sekiguchi |
| 6,295,552 B1 | 9/2001 | Shibata |
| 6,301,245 B1 | 10/2001 | Luzeski et al. |
| 6,314,425 B1 | 11/2001 | Serbinis et al. |
| 6,330,070 B1 | 12/2001 | Toyoda et al. |
| 6,330,079 B1 | 12/2001 | Dugan et al. |
| 6,334,142 B1 | 12/2001 | Newton et al. |
| 6,339,591 B1 | 1/2002 | Migimatsu |
| 6,341,160 B2 | 1/2002 | Tverskoy et al. |
| 6,350,066 B1 | 2/2002 | Bobo, II |
| 6,356,356 B1 | 3/2002 | Miller, Jr. et al. |
| 6,359,881 B1 | 3/2002 | Gerszberg et al. |
| 6,404,513 B1 | 6/2002 | Denker |
| 6,417,930 B2 | 7/2002 | Mori |
| 6,430,272 B1 | 8/2002 | Maruyama et al. |

| | | | |
|---|---|---|---|
| 6,510,438 | B2 | 1/2003 | Hasegawa |
| 6,564,321 | B2 | 5/2003 | Bobo, II |
| 6,597,688 | B2 * | 7/2003 | Narasimhan et al. ......... 370/353 |
| 6,643,034 | B1 | 11/2003 | Gordon et al. |
| 6,742,022 | B1 | 5/2004 | King et al. |
| 6,775,264 | B1 | 8/2004 | Kurganov |
| 6,948,070 | B1 | 9/2005 | Ginter et al. |
| 6,985,576 | B1 * | 1/2006 | Huck ....................... 379/265.09 |
| 7,020,132 | B1 * | 3/2006 | Narasimhan et al. ......... 370/355 |
| 7,769,001 | B2 * | 8/2010 | Narasimhan et al. ......... 370/356 |
| 2001/0014910 | A1 | 8/2001 | Bobo, II |
| 2002/0064149 | A1 * | 5/2002 | Elliott et al. .................. 370/352 |

FOREIGN PATENT DOCUMENTS

| | | |
|---|---|---|
| EP | 0554456 A1 | 8/1993 |
| EP | 0615368 A2 | 9/1994 |
| EP | 0760503 A1 | 3/1997 |
| EP | 0835021 A1 | 4/1998 |
| EP | 0760503 B1 | 8/2001 |
| GB | 2024561 A | 1/1980 |
| GB | 2157117 A | 10/1985 |
| JP | 6164645 | 6/1994 |
| WO | WO-9406230 | 3/1994 |
| WO | WO-9501040 | 1/1995 |
| WO | WO-9506386 | 3/1995 |
| WO | WO-9520288 | 7/1995 |
| WO | WO-9634341 | 10/1996 |
| WO | WO-9641463 | 12/1996 |
| WO | WO-9709682 | 3/1997 |
| WO | WO-9710668 | 3/1997 |
| WO | WO-9723082 | 6/1997 |
| WO | WO-9823058 | 5/1998 |

OTHER PUBLICATIONS

Oracle & NT Software Library, FaxMail Networks for Windows v5.13 Fax over a network; Search results of online search, Dec. 5, 1996 12:03 p.m., (pp. 1-3).
AltaVista Search, SHAREWARE.COM: Search results, Dec. 5, 1995 11:41 a.m., (pp. 1-2).
Yahoo Internet Life, vol. 3, No. 1, Jan. 1997 "Cooltools", (p. 73).
NetScan KOFAX, http://www.netscan.kofax.com/, Dec. 13, 1006 4:09 p.m. (pp. 1-3); http://www.netscan.kofax.com/ brochure.html, Dec. 13, 1996 4:13 p.m. (pp. 1-4); and http://www.netscan.kofax.com/brochure2.html, Dec. 13, 1996 4:23 p.m. (pp. 1-3).
Electronics, Jan. 18, 1979 (379-100), S9054 0063, (pp. 69-70).
*j2 Global Communications, Inc.* v. *Venali, Inc.*, United States District Court Central District of California, Case No. CV04-01172 DDP (AJWx), Defendant Venali, Inc.'s Objections and Responses to Plaintiff j2 Global Communications, Inc.'s First Set of Interrogatories (Nos. 1-7), (19 pages).
"Plaintiff's Opening Markman Brief" in *j2 Global Communications, Inc.* v. *CallWave, Inc.*, CA 04-7068 DDP AJWx.
"Plaintiffs Opposition Markman Brief" in *j2 Global Communications, Inc.* v. *CallWave, Inc.*, CA 04-7068 DDP AJWx.
"Defendant CallWave, Inc.'s Opening Claim Construction Brief" in *j2 Global Communications, Inc.* v. *CallWave, Inc.*, CA 04-7068 DDP AJWx.
"Defendant CallWave, Inc.'s Opposition to Plaintiff j2's Opening Markman Brief" in *j2 Global Communications, Inc.* v. *CallWave, Inc.*, CA 04-7068 DDP AJWx.
"Defendant CallWave's Supplemental Disclosures Pursuant FRCP 26(A)(1)" in *j2 Global Communications, Inc.* v. *CallWave, Inc.*, CA 04-7068 DDP AJWx.
Non-Final Office Action (dated Oct. 24, 2008), U.S. Appl. No. 11/341,408, filed Jan. 26, 2006, First Named Inventor, Anand Narasimhan, (19 pages).
C3 Launches its Advanced Itmail Multi-medial Messaging System for Desk Top PC's Computer and Communications Company Ltd., Jun. 1993.
Fax Mailbox, PC Today, Sep. 1994.
Multimedia Fax-MIME Interworking, Patel, Henderson and Georganas, IEEE, 1994.
IBM Software Allows Phone Messages to be Retrieved Via Internet World Wide Web, press release, Nov. 28, 1995 (announcing product release).
MSN Hotmail Continues to Grow Faster than Any Media Company in History, press release, Feb. 8, 1999 (referencing Jul. 4, 1996 launch of Hotmail, which permitted users to access e-mail accounts through web browsers).
Supplementary European Search Report in European Patent Application No. EP 98 95 0859, Jun. 3, 2005.
International Search Report in International Application No. PCT/US98/20732, Jan. 25, 1999.
International Search Report in Internationa Application No. PCT/US96/05910, Jul. 18, 1996.
Critical Path Data Sheet—Critical Path Notification Server, Dec. 2002r, (2 pages).
Critical Path Data Sheet—Critical Path Messaging Server, Dec. 2002r, (2 pages).
Critical Path Data Sheet—Critical Path Internet File Server, Dec. 2002r, (2 pages).
Critical Path Data Sheet—Critical Path Presentation Server, Dec. 2002r, (2 pages).
Critical Path Data Sheet—Critical Path SMS Access Server, 2002r, (2 pages).
Critical Path Data Sheet—Critical Path Calendar Server, Dec. 2002r, (2 pages).
Critical Path Data Sheet—Critical Path Personal Address Book Server, Dec. 2002r, (2 pages).
CPT™ Meta-Directory Server, Jun. 2002r, (4 pages).
Critical Path Meta-Directory Server, May 8, 2003, http://www.cp.net/solutions/metaDirectoryServer.html, (1 page).
Tumbleweed Communications, May 8, 2003, http://www.tumbleweed.com/en/products/ime_overview.html, (3 pages).
Tumbleweed Communications, May 8, 2003, http:/www/tumbleweed.com/en/products/ime_product_architecture.html, (1 page).
Tumbleweed Communications, May 8, 2003, http://wvvw.tumbleweed.com/en/products/ime_forautomated_deliveries.html, (1 page).
Tumbleweed Communications, May 8, 2003_http://www.tumbleweed.com/dy/print/, (3 pages).
Turnbleweed Cornmunications, May 8, 2003, http://www.tumbleweed.com/en/products/ime_portal_integration.html, (1 page).
Tumbleweed Communications, May 8, 2003, http://www.tumbleweed.com/en/products/ime_message_tracking.html, (1 page).
Tumbleweed Communications, May 8, 2003, http://www.tumbleweed.com/dy/print/, (2 pages).
FaxBack In Forms Reference Guide.
RightFax Web Client Installation and Administration Guide, Version 1.1, 1997.
Notice of Pending Litigation, U.S. District Court, E.D. Texas, Docket No. 6:08-cv-262, (1 page).
Notice of Pending Litigation, U.S. District Court, E.D. Texas, Docket No. 6:08-cv-263, (1 page).
Notice of Pending Litigation, U.S. District Court, E.D. Texas, Docket No. 6:08cv00275-LED, (1 page).
Notice of Pending Litigation, U.S. District Court, E.D. Texas, Docket No. 6:08cv0211, (1 page).
PTO Communication—Review of Relevant Facts (dated Nov. 26, 2007), U.S. Appl. No. 90/007,472, filed Mar. 21, 2005, (4 pages).
PTO Ex Parte Reexamination Communication—Order Granting/Denying Request for Ex Parte Reexamination (dated May 12, 2005), U.S. Appl. No. 90/007,472, filed Mar. 21, 2005, (8 pages).
PTO Ex Parte Reexamination Communication—Notice of Intent to Issue Ex Parte Reexamination Certificate (dated Dec. 6, 2006), U.S. Appl. No. 90/007,472, filed Mar. 21, 2005, (26 pages).
Non-Final Office Action (dated Jul. 7, 2009), U.S. Appl. No. 11/341,408, filed Jan. 26, 2006, First Named Inventor, Anand Narasimhan, (15 pages).
*j2 Global Communications, Inc.* v. *Venali, Inc.*, United States District Court Central District of California, Case No. CV04-01172 DDP (AJWx), litigation cover page.
Captaris Invalidity Claim Charts, U.S. Patent No. 6,597,688, Exhibit D, (29 pages).

Captaris Invalidity Claim Charts, U.S. Patent No. 7,020,132, Exhibit G, (24 pages).
Plaintiff's Opposition Claim Construction Brief in *j2 Global Communications, Inc.* v. *Venali, Inc.*, cv 04-1172 DDP AJWx.
Brief in Opposition to Plaintiff j2's Opening Claim Construction Brief in *j2 Global Communications Inc.* v. *Venali, Inc.*, cv 04-1172 DDP AJWx.
Plaintiff's Opening Claim Construction Brief in *j2 Global Communications, Inc.* v. *Venali, Inc.*, cv 04-1172 DDP AJWx.
Opening Claim Construction Brief in *j2 Global Communications, Inc.* v. *Venali, Inc.*, cv 04-1172 DDP AJWx.
Docket Report from cv 04-1172 DDP AJWx.
Captaris, CAP-j2 012832 (miscellaneous diagram), (1 page).
Captaris, CAP-j2 014033 (miscellaneous diagram), (1 page).
"500 Tips—Communications", DOWJONES, Windows Magazine, Dec. 1, 1993, Issue 412, © 1993 CMP Publications, Inc., CAP-j2 033787-CAP-j2 033793, (7 pages).
"7.2 Administrator's Guide", RightFax, © 1999-2000 AVT, Corp., CAP-j2 007710-CAP-j2 008145, (436 pages).
"8.0 Administrator's Guide", Captaris RightFax, © 2001 Captaris, Inc., CAP-j2 008635-CAP-j2 009044, (410 pages).
"8.0 Docs-on-Demand and TeleConnect Guide", Captaris RightFax, © 2001 Captaris, Inc., CAP-j2 009045-CAP-j2 009133, (89 pages).
"8.0 Document Management Connector Guide", Captaris RightFax, © 2001 Captaris, Inc., CAP-j2 009134-CAP-j2 009165, (32 pages).
"8.0 Fax Board Guide", Captaris RightFax, © 2001 Captaris, Inc., CAP-j2 009166-CAP-j2 009205, (40 pages).
"8.0 OCR Router, OCR Converter, and PDF Module Guide", Captaris RightFax, © 2001 Captaris, Inc., CAP-j2 009206-CAP-j2 009225, (20 pages).
"8.0 SecureDocs Module Guide", Captaris RightFax, © 2002 Captaris, Inc., CAP-j2 009226-CAP-j2009272, (47 pages).
"8.0 SNMP Alerting Module Guide", Captaris RightFax, Revision No. 8.0 Jul. 2001, © 2001 Captaris, CAP-j2 009273-CAP-j2 009302, (30 pages).
"8.5 Administrator's Guide", Captaris RightFax, © 2002 Captaris, Inc., CAP-j2 009342-CAP-j2009780, (439 pages).
"8.5 Document Management Connector Guide", Captaris RightFax, © 2002 Captaris, Inc., CAP-j2 010061-CAP-j2 010080, (20 pages).
"8.5 Fax Board Guide", Captaris RightFax, © 2002 Captaris, Inc., CAP-j2 009782-CAP-j2 009814, (33 pages).
"8.5 Gateway for Lotus Notes Guide", Captaris RightFax, © 2002 Captaris, Inc., CAP-j2 009871-CAP-j2 009934, (64 pages).
"8.5 Gateway for Microsoft Exchange Guide", Captaris RightFax, © 2002 Captaris, Inc., CAP-j2 009815-CAP-j2 009870, (56 pages).
"8.5 Installation Guide", Captaris RightFax, © 2002 Captaris, Inc., CAP-j2 009935-CAP-j2 009973, (39 pages).
"8.5 SecureDocs Module Guide", Captaris RightFax, © 2002 Captaris, Inc., CAP-j2 009974-CAP-j2 010006, (33 pages).
"8.5 SNMP Alerting Module Guide", Captaris RightFax, © 2002 Captaris, Inc., CAP-j2 010007-CAP-j2 010026, (20 pages).
"8.5 TeleConnect Guide", Captaris RightFax, © 2002 Captaris, Inc., CAP-j2 010027-CAP-j2 010040, (14 pages).
"8.5 Web Client Guide", Captaris RightFax, © 2002 Captaris, Inc., CAP-j2 010041-CAP-j2 010060, (20 pages).
"Activating and Using the OCR Converter Module", Captaris RightFax, Version 8.7, © 2004 Captaris, Inc., CAP-j2 011032-CAP-j2 011039, (8 pages).
"Activating and Using the OCR Converter Module", Captaris RightFax, Version 9.0, © 2004 Captaris, Inc, CAP-j2 012018-CAP-j2 012025, (8 pages).
"Activating and Using the OCR Router Module", Captaris RightFax, Version 9.0, © 2004 Captaris, Inc., CAP-j2 012026-CAP-j2 012035, (6 pages).
"Activating and Using the OCR Router Module", Captaris RightFax, CAP-j2 010088-CAP-j2 010092, © 2002 Captaris, Inc, (5 pages).
"Activating and Using the OCR Router Module", Captaris RightFax, Version 8.7, © 2004 Captaris, Inc., CAP-2 011040-CAP-j2 011045, (6 pages).
"Activating and Using the PDF Module", Captaris RightFax, Version 8.7, © 2004 Captaris, Inc., CAP-j2 011046-CAP-j2 011049, (4 pages).
"Activating and Using the PDF Module", Captaris RightFax, Version 9.4, v.1.0, Aug. 22, 2008, CAP-j2 004929-CAP-j2 004932, (4 pages).
"Activating and Using the PDF Module", Captaris RightFax, CAP-j2 010093-CAP-j2 010095, © 2002 Captaris, Inc., (3 pages).
"Activating and Using the PDF Module", Captaris RightFax, Version 9.0, © 2004 Captaris, CAP-j2 012032-CAP-j2 012035, (4 pages).
"Activating and Using the PDF Module", Captaris RightFax, Version 9.3, © 2006 Captaris, CAP-j2 013114-CAP-j2013117, (4 pages).
"Administration Without Hardware (AWOH)", AT&T, DEFINITY Cornmunications System Generic 3 Feature Description (part 2), Issue 3, Mar. 1996, CAP-j2 034229-CAP-j2 034428, (200 pages).
"Administrative Utilities Guide", Captaris RightFax, Version 9.4, v.1.0, Oct. 29, 2008, CAP-j2 004933-CAP-j2 004990, (58 pages).
"Administrator's Guide", Captaris RightFax, Version 9.4, v. 1.0, Oct. 29, 2008, CAP-j2 004991-CAP-j2 005345, (355 pages).
"Administrator's Guide", Captaris RightFax, Version 9.0, © 2005 Captaris, CAP-j2 011176-CAP-j2 011531, (356 pages).
"Administrator's Guide", Captaris RightFax, © 2005 Captaris, CAP-j2 012036-CAP-j2 012391, (356 pages).
"Administrator's Guide", Captaris RightFax, Version 9.3 Feature Pack 2, v.1.0, Aug. 2, 2007, CAP-j2 013118-CAP-j2 013473, (356 pages).
"Administrator's Guide", Captaris RightFax, Version 8.7, © 2004 Captaris, Inc., CAP-j2 010134-CAP-j2 010621, (488 pages).
"Applied Voice Technology announces CallXpress3 Release 4.0, delivering users major new options in voice and call processing; Call management, speech recognition, caller ID, and "Live Reply"™ are highlights of the new system", Kirkland, Washington, Business Wire, Jun. 10, 1996, Applied Voice Technology, Internet article: http://findarticles.com/p/articles/mi_m0EIN/is_1996_June_10/ai_18371430/print?tag=artB . . . , -COM-j2 000832-COM-j2000834, (3 pages).
"Applied Voice Technology Announces New Version of Its Award-Winning Voice and Call Processing System, CallXpress3", Kirkland, Washington, Business Wire, Oct. 7, 1997, Applied Voice Technology, Internet article: http://findarticles.com/p/articles/mi_mOEIN/is_1997_Oct_7/ai_19820527/print?tag=artBo . . . , COM-j2 000814-COM-j2 000815, (2 pages).
"Article 9857 of comp.lang-perl", Newsgroups: comp.infosystems.www.comp.lang.perl . . . , Northwestern University, Evanston, IL, USA, Mon, Jan. 17, 1994, CAP-j2 035689-CAP-j2 035694, (6 pages).
"AT&T EasyLink Services and Visioneer Offer Easy Integration of Paper and Electronic Documents", DOWJONES, Business Wire, Nov. 28, 1994, © 1994 Business Wire, CAP-j2 033794-CAP-j2 033795, (2 pages).
"Backing UP and Restoring the RightFax 9.0 Server and Database", Captaris, © 2005 Captaris, Inc., CAP-j2 011170-CAP-j2 011175, (6 pages).
"Basic Call Management System (BCMS)", AT&T, DEFINITY Communications System Generic 3 Feature Description (part 3), Issue 3, Mar. 1996, CAP-j2 034429-CAP-j2 034628, (200 pages).
"Biscom Introduces the E-fax Machine: the E-mail/Facsimile Solution 'for the Rest of Us'", Biscom, Sep. 19, 1996.
"Call Vectoring", AT&T, DEFINITY Communications System Generic 3 Feature Description (part 4), Issue 3, Mar. 1996, CAP-j2 034629-CAP-j2 034828, (200 pages).
"CallXpress3(R) Unified Messaging to be Fully Compatible with Windows 95(R) and Microsoft Mail Server; Applied Voice Technology . . . ", Business Wire, Wednesday, Aug. 23, 1995, Captaris, Inc., Internet article: http://www.allbusiness.com/technology/software-services-applications-internet/7146087-1 . . . , COM-j2 000828, (1 page).
"CenterPoint Fax Server Administration Guide", CenterPoint Fax Server Administration, © 1997-1998 Coresoft Technologies, Inc., Orem, Utah (p. 1 through p. 101), COM-j2 004921-COM-j2 005021, (101 pages).
"Client for Lotus Notes Quick Reference Card", Captaris Right Fax, The One Solution for Enterprise Fax and e-Document Delivery, © 2001 Captaris Inc., CAP-j2 008629-CAP-j2 008634, (6 pages).
"Client for Lotus Notes Quick Reference Card", Captaris Right Fax, The One Solution for Enterprise Fax and e-Document Delivery, © 2002 Captaris Inc., CAP-j2 009336-CAP-j2 009341, (6 pages).

"Client for Lotus Notes Quick Reference Card", Captaris Right Fax, The One Solution for Enterprise Fax and e-Document Delivery, © 2002 Captaris Inc., CAP-j2 010128-CAP-j2 010133, (6 pages).

"Client for Microsoft Outlook Quick Reference Card", Captaris Right Fax, The One Solution for Enterprise Fax and e-Document Delivery, © 2002 Captaris Inc., CAP-j2 009330-CAP-j2 009335, (6 pages).

"Client for Microsoft Outlook Quick Reference Card", Captaris Right Fax, The One Solution for Enterprise Fax and e-Document Delivery, © 2004 Captaris Inc., CAP-j2 010122-CAP-j2 010127, (6 pages).

"comp.mail.mime meta—FAQ: Help for MIME problems", Ohio State University, C.S.E., downloaded from the Internet at www.cis.ohio-state.edu/text/faq/usenet/mail/mimefaq/partl/faq.html, Jun. 11, 1997.

"Compatibility", Memorandum from Saved by Windows Internet Explorer 8, sent Tuesday, Dec. 22, 2009, CAP-j2 035684, (1 page).

"Conector for FileNet P8 Guide", Captaris RightFax, Version 8.7, © 2004 Captaris, Inc., CAP-j2-013031-CAP-j2 013074, (44 pages).

"Connector for FileNet P8 Guide", Captaris RightFax, Version 8.7, © 2004 Captaris, Inc., CAP-j2 011064-CAP-j2 011107, (44 pages).

"Connector for Hummingbird Enterprise DM Guide", Captaris RightFax, © 2004 Captaris, Inc., CAP-j2 013075-CAP-j2 013104, (30 pages).

"Connector for SAP Guide", Captaris RightFax, Version 9.3, v1.1, May 1, 2008, CAP-j2 014178-CAP-j2 014251, (74 pages).

"Connector for SAP Guide", Captaris RightFax, Version 9.4, v. 1.0, Aug. 22, 2008, CAP-j2 005358-CAP-j2 005431, (74 pages).

"Connector for SAP R/3 Guide", Captaris RightFax, Version 8.7, © 2004 Captaris, Inc., CAP-j2 011108-CAP-j2 011169, (62 pages).

"Defendant Captaris, Inc.'s Local Patent Rule 3-3 Invalidity Contentions (with Exhibits A-G)", j2 Global Communications, Inc. v. Captaris, Inc., U.S. District Court for the Eastern District of Texas—Tyler Division, Case No. 6:08-cv-262 (LED), dated Feb. 6, 2009, Whole Document.

"Defendant Comodo Communications Inc.'s Local Patent Rule 3-3 Invalidity Contentions (with Exhibits A-G)", j2 Global Communications, Inc. v. Comodo Communications, Inc., U.S. District Court for the Eastern District of Texas—Tyler Division, Case No. 6:08-cv-275, dated Mar. 4, 2009, Whole Document.

"Defendant Easylink Services International Corporation's Invalidity Contentions Under P.R. 3-3 (with Exhibits A-B)", j2 Global Communications, Inc. v. Easylink Services International Corporation, U.S. District Court Eastern District of Texas—Tyler Division, Case No. 6:08-cv-263, dated Jan. 16, 2009, Whole Document.

"DEFINITY Communications System Generic 3 Feature Description", AT&T, Issue 3, Mar. 1996 (part 1), CAP-j2 034029-CAP-j2 034228, (200 pages).

"Delivering Unified Messaging Solutions on the Internet", Media Mail, Nov. 2, 1996, downloaded from Internet at www.web.archive.org/web/1996121905113/http://mediamail.com on Mar. 2, 2005.

"Delrina WinFax Pro 4.0 Focuses on Ease of Use", Author unknown, Newsbytes, Post-Newsweek Business Information, Inc. (Mar. 15, 1994).

"Delrina WinFax Pro 4.0 User's Guide", Delrina, Third Edition, Apr. 1995, © 1992-1995 Delrina (Canada) Corporation, Document No. 12-30-01069, COM-j2 004173-COM-j2 004556, (384 pages).

"Delrina WinFax Pro for Networks 4.1", Marketing Brochure, CAP-j2 000510-CAP-j2 000510, (10 pages).

"Delrina WinFax Pro for Networks 4.1 Setup Guide", First Edition, May 1995, © 1993-1995 Delrina, Document No. 00-225-101-40012, COM-j2 003852-COM-j2 004057, (206 pages).

"Delrina WinFax Pro for Networks 4.1 User's Guide", First Edition, May 1995, © 1993-1995 Delrina, Document No. 00-225-101-40012, COM-j2 004058-COM-j2 004172, (115 pages).

"Digital Note Fax2Net R5S 1-A Beginners Guide to Digital Mail Fax", Digital Mail Limited, Oct. 31, 1996.

"Direct Department Calling (DDC) and Uniform Call Distribution (UCD)", AT&T, Definity Communications System Generic 3 Feature Description (part 5), Issue 3, Mar. 1996, CAP-j2 034829-CAP-j2 035028, (200 pages).

"Docs-on-Demand Guide", Captaris RightFax, Version 8.7, © 2004 Captaris, Inc., CAP-j2 010622-CAP-j2 010677, (56 pages).

"Docs-on-Demand Guide", Captaris RightFax, Version 9.4, v. 1.0, Aug. 8, 2008, CAP-j2 005432-CAP-j2 005485, (54 pages).

"Docs-on-Demand Guide", Captaris RightFax, Version 9.3 Feature Pack 1, v.1.0, Jun. 6, 2007, CAP-j2 013569-CAP-j2 013624, (56 pages).

"Docs-on-Demand Guide", Captaris RightFax, Version 9.0, © 2004 Captaris, CAP-j2 012404-CAP-j2 012459, (56 pages).

"Document Management Connector Guide", Captaris RightFax, Version 9.0, © 2004 Captaris, CAP-j2 012460-CAP-j2 012483, (24 pages).

"Document Management Connector Guide", Captaris RightFax, Version 8.7, © 2004 Captaris, Inc., CAP-j2 011008-CAP-j2 011031, (24 pages).

"DocumentRoot Directive", Miscellaneous page, CAP-j2 036187, (1 page).

"E-Mail Gateway Guide", © 1990-1996 RightFAX, Inc., Document No. AL1210-120196, COM-j2 001857-COM-j2 001859, (82 pages).

"Exchange Module Guide", Captaris RightFax, Version 9.4, v. 1.0, Oct. 29, 2008, CAP-j2 005920-CAP-j2 005967, (48 pages).

"Exhibit A", j2 Global Communications, Inc. v. Protus IP Solutions Inc., U.S. District Court Eastern District of Texas—Tyler Division, Case No. 6:08-cv-211-LED-JDL, Invalidity Contentions of Defendant Protus IP Solutions Inc., dated Jan. 30, 2009, (Exhibit page & 378 pages).

"Exhibit B", j2 Global Communications, Inc. v. Protus IP Solutions Inc., U.S. District Court Eastern District of Texas—Tyler Division, Case No. 6:08-cv-211-LED-JDL, Invalidity Contentions of Defendant Protus IP Solutions Inc., dated Jan. 30, 2009, (Exhibit page & 401 pages).

"Fax Board Guide", Captaris RightFax, Version 9.4, v. 1.0. Aug. 21, 2008, CAP-j2 005486-CAP-j2 005513, (28 pages).

"Fax Board Guide", Captaris RightFax, Version 8.7, © 2004 Captaris, Inc., CAP-j2 010678-CAP-j2 010717, (40 pages).

"Fax Board Guide", Captaris RightFax, Version 9.0, © 2005 Captaris, CAP-j2 011532-CAP-j2 011577, (46 pages).

"Fax Board Guide", Captaris RightFax, Version 9.0, © 2005 Captaris, CAP-j2 012484-CAP-j2 012529, (46 pages).

"Fax Board Guide", Captaris RightFax, Version 9.3 Feature Pack 2, v.1.0, Aug. 21, 2007, CAP-j2 013625-CAP-j2 013674, (50 pages).

"Fax Press—Castelle Faxpress Exchange Direct", Products, Castelle, Internet article: http://web.archive.org/web/19980118063644/castelle.com/products/fpex . . . , PRO015281-PRO015282, (2 pages).

"Fax Press—End User Features", Products, Castelle, Internet article: http://web.archive.org/web/19980118063518/castelle.com/products/fpen . . . , PRO015279-PRO015280, (2 pages).

"Fax Press—Internet Faxing White Paper", Products, Castelle, Internet article: http://web.archive.org/web/19980118061938/castelle.com/products/intern . . . , PRO015283-PRO015291, (9 pages).

"Fax Press—Lotus cc-Mail Gateway", Products, Castelle, Internet article: http://web.archive.org/web/19980118063710/castelle.com/products/fplc . . . , PRO015292-PRO015293, (2 pages).

"Fax Press—Lotus Notes Gateway", Products, Castelle, Internet article: http://web.archive.org/web/19980118063657/castelle.com/products/fplno . . . , PRO015294-PRO015295, (2 pages).

"Fax Press—Network Diagram", Products, Castelle, Internet article: http://web.archive.org/web/19980428063944/castelle.com/products/fpus . . . , PRO015296, (1 page).

"Fax Press—Supervisor's Guide", Network Fax/Print Server, P/N 60-1016-002 Rev A, Aug. 5, 1993, Castelle, Santa Clara, CA, COM-j2 001235-COM-j2 001433, (199 pages).

"Fax Press—The Integrated Network Fax Server", Products, Castelle, Internet article: http://web.archive.org/web/19980118062053/castelle.com/products/fp 10 . . . , PRO015298-PRO015299, (2 pages).

"Fax Solutions", LAN Times, Sep. 23, 1996, v13 n21 p. 123(5), (10 pages).

"FaxSav Launches Serverlink—Allows Third Party Vendors to Offer Internet Faxing", FaxSav, Edison, N.J./Tuscon, AZ, Jun. 2, 1997, Internet article: http://www.faxsav.com/company/html/svrlink.html, PRO015330-PRO015422, (93 pages).

"faxSAV Rebiller/Reseller Manual", Version 1, Oct. 1997, PRO020935-PRO021155, (221 pages).

"FaxUtil™ Quick Reference Card", Captaris RightFax, The One Solution for Enterprise Fax and e-Document Delivery, © 2001 Captaris, Inc., CAP-j2 008616-CAP-j2 008621, (6 pages).

"FaxUtil™ Quick Reference Card", Captaris RightFax, The One Solution for Enterprise Fax and e-Document Delivery, © 2002 Captaris, Inc., CAP-j2 009318-CAP-j2 009323, (6 pages).

"FaxUtil™ Quick Reference Card", Captaris RightFax, The One Solution for Enterprise Fax and e-Document Delivery, © 2001 Captaris, Inc., CAP-j2 010110-CAP-j2 010115, (6 pages).

"Firewalls: a technical Overview", IT Security Cookbook—Firewalls: Securing external Network connections, (Feb. 27, 2009), Internet article: http://www.boran.com/security/it12-firewall.html, (42 pages).

"Frequently Asked Questions", Jfax Personal Telecom, downloaded from Internet at www.jfax.net/faq.html on Oct. 31, 1996.

"Gateway for Lotus Notes Guide", Captaris RightFax, Version 8.7, © 2004 Captaris, Inc., CAP-j2 010776-CAP-j2 010835, (60 pages).

"Gateway for Microsoft Exchange Guide", Captaris RightFax, Version 8.7, © 2004 Captaris, Inc., CAP-j2 010718-CAP-j2 010775, (58 pages).

"Gateway Software", W3C, World Wide Web Gateway Software, System 33 Gateway code, Internet article: http://www.w3.org/Gateways.html, CAP-j2 035952-CAP-j2 035965, (14 pages).

"Graphics, Visualization, and Usability Center GSQL-ORACLE Backend", Memorandum from Saved by Windows Internet Explorer 8, sent Tuesday, Dec. 22, 2009, CAP-j2 035628-CAP-j2 035629, (2 pages).

"GSQL in Detail", Memorandum from Saved by Windows Internet Explorer 8, sent Tuesday. Dec. 22, 2009, CAP-j2 035630-CAP-j2 035633, (4 pages).

"Guide to Intelligent Least Cost Routing", RightFAX, Inc., Tucson, Arizona, USA (1997), (pp. 1-17).

"Guide to Internet Faxing", RightFAX, Inc., Tucson, Arizona, USA (1997), (pp. 1-16).

"Index Page Customization", MHonArc, CAP-j2 035670-CAP-j2 035674, (5 pages).

"Ingegration Module Guide", Captaris RightFax, Version 9.4, v. 1.0. Sep. 17, 2008, CAP-j2 005592-CAP-j2 005819, (228 pages).

"Installation & Administration Guide", © 1990-1996 RightFAX, Inc., Document No. AL1104-120196, COM-j2 002149-COM-j2 002331, (183 pages).

"Installation & Administration Guide", RightFAX, Version 3, © 1990-1993 Cracchiolo & Feder, Inc., Printed Jul. 21, 1993, COM-j2 003216-COM-j2 003428, (213 pages).

"Installation & Administration Guide", RightFAX, Version 3.5, © 1990-1994 Cracchiolo & Feder, Inc., Printed in the USA Mar. 24, 1994, COM-j2 003429-COM-j2 003851, (217 pages).

"Installation & Administration Guide", RightFAX, Version 3.51, © 1990-1994 Cracchiolo & Feder, Inc., Printed in the USA Aug. 30, 1994, COM-j2 003646-COM-j2 003646, (206 pages).

"Installation Guide", Captaris RightFax, Version 9.0, © 2005 Captaris, CAP-j2 011578-CAP-j2 011839. (62 pages).

"Installation Guide", Captaris RightFax, Version 9.0, © 2005 Captaris, CAP-j2 012536-CAP-j2 012603, (62 pages).

"Installation Guide", Captaris RightFax, Version 9.3 Feature Pack 2, v.1.2, May 13, 2008, CAP-j2 013681-CAP-j2 013772, (92 pages).

"Installation Guide", Captaris RightFax, Version 8.7, © 2004 Captaris, Inc., CAP-j2 010836-CAP-j2 010907, (72 pages).

"Installation Guide", Captaris RightFax, Version 9.4, v. 1.0, Nov. 18, 2008, CAP-j2 005520-CAP-j2 005591, (72 pages).

"Installing and Using the InterAction Integration Module", Captaris RightFax, Version 8.7, © 2004 Captaris, Inc., CAP-j2 011050-CAP-j2 011055, (6 pages).

"Installing and Using the InterAction Integration Module", Captaris RightFax, Version 9.3, © 2006 Captaris, CAP-j2 013773-CAP-j2 013778, (6 pages).

"Installing and Using the InterAction Integration Module", Captaris RightFax, Version 9.0, © 2004 Captaris, CAP-j2 012598-CAP-j2 012603, (6 pages).

"Installing and Using the InterAction Integration Software", Captaris RightFax, © 2002 Captaris, Inc., CAP-j2 010096-CAP-j2 010101, (6 pages).

"Installing and Using the WinFax PRO Integration Module", Captaris RightFax, © 2002 Captaris, Inc., CAP-j2 010102-CAP-j2 010109, (8 pages).

"Installing and Using the WinFax PRO Integration Module", Captaris RightFax, Version 8.7, © Captaris, Inc., CAP-j2 011056-CAP-j2 011063, (8 pages).

"InstantCom//ESL", Instantcom Communication Software, V 1.3C, Instant Information Inc., Lake Oswego, Oregon © 1987, Version ESL/XC for Western Union's EasyLink, IBM PC and Compatibles, Release 1.3, (47 pages).

"Integrating RightFAX and the HP 9100C Digital Sender", RightFAX v7.0 Administrator's Guide Addendum, CAP-j2 007690-CAP-j2 007695, (6 pages).

"Integration Module Guide", Captaris RightFax, Version 9.3 Feature Pack 2, v.1.0, Apr. 28, 2008, CAP-j2 013779-CAP-j2 014004, (226 pages).

"Integration Module Guide", Captaris RightFax, Version 9.0, © 2005 Captaris, CAP-j2 011640-CAP-j2 011867, (228 pages).

"Integration Module Guide", Captaris RightFax, Version 9.0, © 2005 Captaris, CAP-j2 012604-CAP-j2 012831, (228 pages).

"Intel FAXability Plus Software for Windows—User's Guide", © 1992, 1993 Intel Corporation, First Edition Aug. 1992, Second Edition Aug. 1993, COM-j2 002924-COM-j2 002991, (68 pages).

"Intel NET SatisFAXtion Software—Fax Administration Guide", © 1992, 1993 Intel Corporation, First Edition Aug. 1002, Second Edition Aug. 1993, COM-j2 002774-COM-j2 002923, (150 pages).

"Intel NET SatisFAXtion Software—Installation Guide for NetWare Networks", © 1992, 1993 Intel Corporation, First Edition Aug. 1992, Second Edition Sep. 1993, COM-j2 002746-COM-j2 002773, (28 pages).

"Intel NET SatisFAXtion Software—User's Guide", © 1992, 1993 Intel Corporation, First Edition Aug. 1992, Second edition Aug. 1993, COM-j2 002608-COM-j2 002745, (138 pages).

"InterAction Integration Guide", @2000 AVT Corp., Revision No. 7.2 Sep. 2000, CAP-j2 008602-CAP-j2 008615, (14 pages).

"InterAction Integration Guide", RightFAX, © 2000 AVT Corp., Revision No. 7.0.1 Mar. 2000, CAP-j2 007696-CAP-j2 007709, (14 pages).

"Internet Information Server Technical Articles—Web Services: Frequently Asked Questions", Microsoft Corporation, Sep. 15, 1997, © 2009 Microsoft Corporation, Internet article: http://msdn.microsoft.com/en-us/library/ms951760(printer).aspx, (3 pages).

"InternetLink Module Guide", Captaris RightFax, Version 9.3, © 2006 Captaris, CAP-j2 014005-CAP-j2 014022, (18 pages).

"Invalidity Contentions of Defendant Protus IP Solutions Inc.", *j2 Global Communications, Inc. v. Protus IP Solutions Inc.*, U.S. District Court Eastern District of Texas—Tyler Division, Case No. 6:08-cv-211-LED-JDL, dated Jan. 30, 2009, (45 pages).

"JFax Personal Telecom—Plug a Phone Into Your E-Mail", downloaded from the Internet at www.jfax.com on Oct. 31, 1996.

"Look Ahead Interflow", AT&T, DEFINITY Communications System Generic 3 Feature Description (part 6), Issue 3, Mar. 1996, CAP-j2 035029-CAP-j2 035228, (200 pages).

"Lotus Executive Details Notes' Work Flow Strategy; Pinches Notes as a platform for Third-Party Products", Author unknown, in Network World (Sep. 6, 1993), (p. 27).

"Lotus Fax Server gives cc: Mail, Notes users better fax gateway services.", Westlaw NewsRoom, InfoWorld, © 1995 InfoWorld Media Group, Inc., Jan. 30, 1995, vol. v17, Issue n5, CAP-j2 033330-CAP-j2.33331, (2 pages).

"Lotus Notes Internet Cookbook", Last modified: Apr. 21, 1995, © 1995 Lotus Development Corporation, Internet article: file///Users/aporter/Consulting/Tmp/Send/LotusNotes/Lotus%20Notes%20Internet%20Cookbook.webarchive, CAP-j2 035641-CAP-j2 035665, (25 pages).

"Lotus Notes Module Guide", Captaris Right Fax, Version 9.4, v. 1.0. Sep. 3, 2008, CAP-j2 005880-CAP-j2 005919, (40 pages).

"Lotus Notes Module Guide", Captaris RightFax, Version 9.0, © 2005 Captaris, CAP-j2 011868-CAP-j2 011923, (56 pages).

"Lotus Notes Module Guide", Captaris RightFax, Version 9.0, © 2005 Captaris, CAP-j2 012833-CAP-j2 012888, (56 pages).

"Lotus Notes Module Guide", Captaris RightFax, Version 9.3, © 2006 Captaris, CAP-j2 014034-CAP-j2 014093, (60 pages).

"Lotus Ships Lotus Notes: Document Imaging Release 2; Office Imaging Made Easy and Affordable", Business Wire, Nov. 22, 1993, © 1993 Business Wire, CAP-j2 035667-CAP-j2 035669, (4 pages).

"Lotus Turns up the Heat on Microsoft Exchange Rival", Network Week, Jan. 27, 1995.

"mail2HTML.c", © 1993 Basis Systeme netzwerk (BSn), Munich, Federal Republic of Germany, Internet article: file://C:\Documents and Settings\SCurtis\LocalSettings\Temp\mail2HTML.c, CAP-j2 036211-CAP-j2 036227, (17 pages).

"Mechanisms for Specifying and Describing the Format of Internet Message Bodies", MIME (Multipurpose Internet Mail Extension) Part One, Internet RFC 1341 and 1521, Sep. 1993.

"Meet the Intranet: Corporate Webs and maybe the next thing in client server (corporate networks similar to the World Wide Web)", Publication Date: Jun. 30, 1996, Source: Computer Industry Report, Internet article: http://www.accessmylibrary.com/comsite5/bin/aml_landing_...item_id=0286-9386536&action=print&page=aml_article_print, (7 pages).

"Message Header Extensions got Non-ASCII Text", MIME (Multi-purpose Internet Mail Extensions) Part Two, Internet RFC 1342, Sep. 1993.

"Messaging Connector—User Guide", CommercePath, Messaging Connector for Lotus Notes, © 1997 CommercePath, Inc., Portland, Oregon, Part No. 140111031 1197, COM-j2 003118-COM-j2 003159, (44 pages).

"Metholody for Mail Delivery in a Multi-Media Environment", IBM Technical Disclosure Bulletin, Apr. 1993, (pp. 507-508).

"Microsoft Exchange Module Guide", Captaris RightFax, Version 9.3 Feature Pack 2, v.1.1, Oct. 4, 2007, CAP-j2 014094-CAP-j2 014145, (52 pages).

"Microsoft Exchange Module Guide", Captaris RightFax, Version 9.0, © 2005 Captaris, CAP-j2 011924-CAP-j2 011969, (46 pages).

"Microsoft Exchange Module Guide", Captaris RightFax, Version 9.0, © 2005 Captaris, CAP-j2 012889-CAP-j2 012934, 46 pages.

"NetLink User Guide", NetLink Version 2.1, CommercePath Workstation, Portland, Oregon, No. 141111021 0997, COM-j2 003048-COM-j2 003115, (69 pages).

"Novell Inc. to Demonstrate Alex, a Universal In-box That Will Accept and Store Email, Voice mail and Faxes", Computer Reseller News, Feb. 6, 1995.

"Oracle Purchasing 11i Connector", Captaris RightFax, Version 9.3, © 2006 Captaris, CAP-j2 014023-CAP-j2 014032, (10 pages).

"Oracle Purchasing 11i Connector Guide", Captaris RightFax, Version 9.4, v. 1.0, Aug. 22, 2008, CAP-j2 005820-CAP-j2005829, (10 pages).

"Path Index Error", Copyright © 2001, Internet Archive (miscellaneous document), CAP-j2 008628, (1 page).

"Path Index Error", Copyright © 2001, Internet Archive (miscellaneous document), CAP-j2 009781, (1 page).

"Push Proxy Gateway Guide", Captaris RightFax, Version 9.0, © 2004 Captaris, CAP-j2 012935-Cap-j2 012954, (20 pages).

"Quick Reference Guide—Client for Lotus Notes", Captaris RightFax, Captaris RightFax Quick Reference Guide, © 2008 Captaris, Inc., CAP-j2 005346-CAP-j2 005352, (7 pages).

"Quick Reference Guide—Client for Lotus Notes", Captaris RightFax, Captaris RightFax Quick Reference Guide, © 2008 Captaris, Inc., CAP-j2 013556-CAP-j2 013562, (7 pages).

"Quick Reference Guide—Client for Lotus Notes", Captaris RightFax, Captaris RightFax Quick Reference Guide, © 2004 Captaris, Inc., CAP-j2 012392-CAP-j2 012397, (6 pages).

"Quick Reference Guide—Client for Microsoft Outlook", Captaris RightFax, Captaris RightFax Quick Reference Guide, © 2004 Captaris, Inc., CAP-j2 012398-CAP-j2 012402, (6 pages).

"Quick Reference Guide—Client for Microsoft Outlook", Captaris RightFax, Captaris RightFax Quick Reference Guide, © 2006 Captaris, Inc., CAP-j2 013563-CAP-j2 013568, (6 pages).

"Quick Reference Guide—Client for Microsoft Outlook", Captaris RightFax, Captaris RightFax Quick Reference Guide, © 2008 Captaris, Inc., CAP-j2 005353-CAP-j2 005357, (5 pages).

"Quick Reference Guide—FaxUtil Client for Windows", Captaris RightFax, Captaris RightFax Quick Reference Guide, © 2006 Captaris, Inc., CAP-j2 013675-CAP-j2 013680, (6 pages).

"Quick Reference Guide—FaxUtil Client for Windows", Captaris RightFax, Captaris RightFax Quick Reference Guide, © 2004 Captaris, Inc., CAP-j2 012530-CAP-j2 012535, (6 pages).

"Quick Reference Guide—RightFax 9.4 FaxUtil Client for Windows", Captaris RightFax, Captaris RightFax Quick Reference Guide, © 2008 Captaris, Inc., CAP-j2 005514-CAP-j2 005519, (6 pages).

"Readme File", Captaris RightFax 9,0, Dec. 2004, © 2004 Captaris, Inc., CAP-j2 012004-CAP-j2 012014, (11 pages).

"Restriction—Voice Terminal—Origination", AT&T, DEFINITY Communications System Generic 3 Feature Description (part 7), Issue 3, Mar. 1996, CAP-j2 035229-CAP-j2035428, (200 pages).

"RightFax 6.0 Administrator's Guide", © 1990-1998 RightFAX, Inc., CAP-j2 006142-CAP-j2 006438, (297 pages).

"RightFax 6.0 Fax Board Guide", © 1990-1998 RightFAX, Inc., Document No. 005-00088-02, Revision No. 1, Nov. 1998, CAP-j2 006739-CAP-j2 006784, (46 pages).

"RightFAX 6.0 Optional Modules Guide", © 1990-1998 RightFAX, Inc., CAP-j2 006439-CAP-j2 006738, (300 pages).

"RightFax 6.0 User's Guide", Revision No. 1, Nov. 1998, Document No. (Spiral bound edition: 000-00019-02; Perfect bound edition: 000-00023-02), © 1990-1998 RightFAX, inc., CAP-j2 005994-CAP-j2 006141, (148 pages).

"RightFAX 7.2 Docs-on-Demand and TeleConnect Guide", © 2000 AVT Corp., CAP-j2 008238-CAP-j2 008353, (116 pages).

"RightFAX 7.2 Document Management Connector Guide", © 2000 AVT Corp., CAP-j2 008194-CAP-j2 008237, (44 pages).

"RightFAX 7.2 Fax Board Guide", © 2000 AVT Corp., CAP-j2 008146-CAP-j2 008193, (48 pages).

"RightFAX 7.2 Gateway for Microsoft Exchange, Gateway for Lotus Notes, and Web Client Guide", © 2000 AVT Corp., CAP-j2 008354-CAP-j2008512, (159 pages).

"RightFAX 7.2 OCR Router, OCR Converter, and PDF Module Guide", © 2000 AVT Corp., CAP-j2 008513-CAP-j2 008543, (31 pages).

"RightFAX 7.2 SNMP Alerting Module Guide", © 200 AVT Corp., CAP-j2 008544-CAP-j2 8586, (43 pages).

"RightFax 9.0 Upgrade Preparedness FAQ", Captaris.com, © 2009, CAP-j2 012015-CAP-j2 012017, (3 pages).

"RightFax 9.3 Administrative Utilities Readme", © 2006 Captaris, CAP-j2 013474-CAP-j2 013555, (82 pages).

"RightFax 9.3 Feature/Service Pack 2 Readme", © 2007 Captaris, version 1.1, Sep. 17, 2007, CAP-j2 013105-CAP-j2 013113, (9 pages).

"RightFax 9.4 Release Notes", © 2008 Captaris, Inc., version 1.0, Dec. 4, 2008, CAP-j2 004887-CAP-j2 004928, (42 pages).

"RightFAX Administration Guide", © 1990-1997 RightFAX, Inc., Document No. 00500011-01, Revision No. 1, May 1997, CAP-j2 033332-CAP-j2 033499, (168 pages).

"RightFAX Brings Award-Winning LAN Fax Software to Multi-Platform Environments With Web Client Module; Fax Server Software Leader Debuts New Module; Adds Remote Internet Connectivity to LAN Fax Server", HighBeam Research, © 1996 Business Wire, Oct. 11, 1996, Tucson, AZ, USA, Internet article at: http://www.highbeam.com/DocPrint . . . , CAP-j2 036190-CAP-j2 036191, (2 pages).

"RightFax Database Schema Report", Captaris, Tables, 64 items, CAP-j2 005830-CAP-j2 005879, (50 pages).

"RightFAX Docs-on-Demand and TeleConnect Guide", © 1999-2000 AVT Corp., CAP-j2 007291-CAP-j2 007406, (116 pages).

"RightFAX Document Management Connector", © 1990-1998 RightFAX, Inc., Document No. 005-00077-02, Revision No. 1, Aug. 1998, CAP-j2 006788-CAP-j2 006815, (28 pages).

"RightFAX E-Mail Gateway Guide", Version 3.51, RightFAX, Tucson, AZ, © 1990-1994 Cracchiolo & Feder, Inc., COM-j2 003160-COM-j2 003215, (56 pages).

"RightFAX E-Mail Gateway Guide", © 1990-1997 RightFAX, Inc., Document No. 005-00022-02, Revision No. 1, May 1997, CAP-j2 033500-CAP-j2 033613, (114 pages).

"RightFAX Introduces New Fax Server Designed for the Enterprise", RightFAX News Release, RightFAX, Inc., Tucson, Arizona, USA, May 27, 1997, (3 pages).

"RightFAX Poised for Internet Faxing", RightFAX News Release, RightFAX, Inc., Tucson, Arizona, USA, May 27, 1997, (2 pages).

"RightFax Push Proxy Gateway Guide", Captaris, Version 9.3, © 2006 Captaris, Inc., CAP-j2 014146-CAP-j2 014177, (32 pages).

"Rightfax Ships Internet Connectivity Module for LAN Fax Software", RightFAX News Release, RightFAX, Inc., Tucson, Arizona, USA, Feb. 10, 1997, (2 pages).

"RightFax v6.0 Fax Board Guide Errata", Corrected Version of the TruFax section in Chapter 1 of the RightFax 6.0 Fax Board Guide, revision No. 1, Nov. 1998, CAP-j2 006785-CAP-j2 006787, (3 pages).

"RightFAX v7.0 Document Management Connector Guide", © 1999-2000 AVT Corp., CAP-j2 007248-CAP-j2007290, (43 pages).

"RightFAX v7.0 Fax Board Guide", © 1999-2000 AVT Corp., CAP-j2 007407-CAP-j2 007454, (48 pages).

"RightFAX v7.0 Gateway for Microsoft Exchange, Gateway for Lotus Notes, and Web Client Guide", © 1999-2000 AVT Corp., CAP-j2 007455-CAP-j2 007596, (142 pages).

"RightFax v7.0 OCR Router, OCR Converter, and PDF Module Guide", © 1999-2000 AVT Corp., CAP-j2 007597-CAP-j2 007627, (31 pages).

"RightFAX v7.0 SNMP Alerting Module Guide", © 1999-2000 AVT Corp., CAP-j2 007628-CAP-j2 007670, (43 pages).

"RightFAX v7.0 WinFax PRO Integration Module Guide", © 1999-2000 AVT Corp., CAP-j2 007671-CAP-j2 007689, (19 pages).

"RightFAX Web Client (RightFax's RightFAX Web Client)(Product Announcement)(Brief Article)", Software Magazine, Apr. 1, 1997, HighBeam Research, Internet article: http://www.highbeam.com/DocPrint . . . , CAP-j2 036192, (1 page).

"RightFax/WinFax PRO Integration Module Guide", Captaris RightFax, Revision No. 8.0 Jul. 2001, © 2001 Captaris, Inc., CAP-j2 009303-CAP-j2 009317, (15 pages).

"RightFax/WinFax PRO Integration Module Guide", Captaris RightFax, Revision 8.0 Jul. 2001, © 2001 Captaris, Inc., CAP-j2 008587-CAP-j2 008601, (15 pages).

"ScanFX-Scanning Hardware for Internet E-Mail", Aug. 1990.

"ScanFX-Scanning Hardware for Internet E-Mail", Our Business Machines, Inc., OBM's Editorial Resource Chest, Aug. 1996, Irwindale, CA.

"SecureDocs Guide", Captaris RightFax, Version 9.3 Feature Pack 1, v.1.0, © 2006 Captaris, CAP-j2 014252-CAP-j2 014281, (30 pages).

"SecureDocs Guide", Captaris RightFax, Version 9.4, v.1.0, Oct. 9, 2008, CAP-j2 005968-CAP-j2 005993, (26 pages).

"SecureDocs Module Guide", Captaris RightFax, Version 9.0, © 2005 Captaris, CAP-j2 012955-CAP-j2 012988, (34 pages).

"SecureDocs Module Guide", Captaris RightFax, Version 8.7, © 2004 Captaris, Inc., CAP-j2 010908-CAP-j2 010941, (34 pages).

"SecureDocs Module Guide", Captaris RightFax, Version 9.0, © 2005 Captaris, CAP-j2 011970-CAP-j2012003, (34 pages).

"SNMP Alerting Module Guide", Captaris RightFax, Version 8.7, © 2004 Captaris, Inc., CAP-j2 010942-CAP-j2 010965, (24 pages).

"SNMP Alerting Module Guide", Captaris RightFax, Version 9.0, © 2004 Captaris, CAP-j2 012989-CAP-j2 013012, (24 pages).

"TeleConnect Guide", Captaris RightFax, Version 8.7, © 2004 Captaris, Inc., CAP-j2 010966-CAP-j2 010983, (18 pages).

"TeleConnect Guide", Captaris RightFax, Version 9.0, © 2004 Captaris, CAP-j2 013013-CAP-j2 013030, (18 pages).

"The DCA/Intel Commlunicating Applications Specification", Intel Corporation, Digital Communications Associates, Inc., Version 1.0A, Sep. 1988, © 1988, Intel Part No. 301812-002, COM-j2 002992-COM-j2 003046, (55 pages).

"Three Pronged Strategy for Octel, as it integrates VMX and Moves from Core Market to New Territories", Computergram International, Aug. 1995, n.2719, ComputerWire, Inc.

"Unified Directory Structure", Memorandum from Saved by Windows Internet Explorer 8, sent Tuesday, Dec. 22, 2009, CAP-j2 035942, (1 page).

"Unified Messaging Solutions on the Road", Mar. 7, 1995, Computer Telephony Expo, Dallas Texas.

"Users Guide", RightFAX, Version 3.5, © 1990-1994 Cracchiolo & Feder, Inc., Printed Mar. 24, 1994, COM-j2 002414-COM-j2 002509, (96 pages).

"User's Guide", © 1990-1996 RightFAX, Inc., Document No. AL1000-070196, COM-j2 001939-CCOM-j2 002148, (210 pages).

"v7.0 Administrator's Guide", RightFAX, Revision No. 7.0.2 May 2000, Document No. 000-00031-00, © 1999-2000 AVT Corp. CAP-j2 006816-CAP-j2 007247, (432 pages).

"Web Client Guide", Captaris RightFax, Version 8.7, © 2004 Captaris, Inc., CAP-j2 010984-CAP-j2 011007, (24 pages).

"Web Client™ Quick Reference Card", Captaris RightFax, The One Solution for Enterprise Fax and e-Document Delivery, © 2001 Captaris, Inc., CAP-j2 008622-CAP-j2 008627, (6 pages).

"Web Client™ Quick Reference Card", Captaris RightFax, The One Solution for Enterprise Fax and e-Document Delivery, © 2002 Captaris, Inc., CAP-j2 009324-CAP-j2 009329, (6 pages).

"Web Client™ Quick Reference Card", Captaris RightFax, The One Solution for Enterprise Fax and e-Document Delivery, © 2002 Captaris, Inc., CAP-j2 010116-CAP-j2 010121, (6 pages).

"Wide Area Networking Puts Remote Offices On-Line", Managing Office Technology, Sep. 1994, vol. 39, USA, (pp. 49-50, 52).

"Wideband Switching", AT&T, DEFINITY Communications System Generic 3 Feature Description (part 8), Issue 3, Mar. 1996, CAP-j2 035429-CAP-j2 035612, (184 pages).

"WinFax Pro User's Guide", Delrina, Version 3.0, COM-j2 004557-COM-j2 004920, (364 pages).

Andreesssen, Marc, "NSCA Mosaic for X 2.0 available", Wed. Nov. 10, 1993, WWW-Talk Oct.-Dec. 1993, Internet article: file:///Users/aporter/Consulting/Tmp/Send/Mosaic/WWW-Talk%20Oct-Dec%201993:%20NCSA%20Mosaic%20for%20X%202.0%20available.webarchive, CAP-j2 035966-CAP-j2 035973, (8 pages).

Bachus, Kevin, "Touring Lotus Notes: The New World of Groupware", DOWJONES, Mar. 1, 1994, Windows Magazine, Issue: 503, © 1994 CMP Publications, Inc., CAP-j2 035613-CAP-j2 035620, (8 pages).

Ballard, N., "@ The Paperless Office", Jfax Personal Telecom, downloaded from the Internet at www.jfax.net/ballard1.html on Oct. 31, 1996.

Berners-Lee, T., et al., "Hypertext Transfer Protocol—HTTP/1.0", Network Working Group Internet-Draft, Dec. 19, 1994, PRO014594-PRO014636, (43 pages).

Blankenhorn, Dana, "Pursuing one peripheral. (peripherals combining printers, copiers, scanners and facsimile machines are possible).", Gale Cengage Learning, Datamation, 34.n20, Oct. 15, 1998, pp. 71(3), Document No. A7075445, CAP-j2 000001-CAP-j2 000006, (6 pages).

Braden (Ed.), R., "Requirements for Internet Hosts—Application and Support", Internet Engineering Task Force, Network Working Group, RFC 1123, Oct. 1989.

Brennan, Tom, "Beware the FAX BEAST", NetworkWorld Reprint, Nov. 27, 1995, vol. 12, No. 48, © 1995 by Network World Inc., Framingham, MA, El Production A 000373—El Production A 000376, (4 pages).

Chan, H., et al., "Integrated Telephone/Fax/Paging/Email Services over ATM/MAN-based Personal Communication Networks", Department of Electrical and Computer Engineering, The University of British Columbia, Vancouver, B.C., Canada.

Chesnais, Pascal R., et al., "The Fishwrap Personalized News System", MIT Media Laboratory, Cambridge, Mass, USA, CAP-j2 032982-CAP-j2 032989, (8 pages).

Cook, Rick, "What's Ahead for PC/FAX: In a Word, Software. This New Class of PC Software is Poised to Take Faxing to a Much Higher Level. (Includes Related Article on Development of Computer Facsimile Boards) (PCS & Workstations: Communications)", Factiva, © 1992 Cahners Publishing Company, Jul. 1, 1992, COM-j2 000826-COM-j2 000827, (2 pages).

Cormen, Thomas H., et al., "Introduction to Algorithms", The MIT Press, Cambridge, Mass., Eighth printing 1992, (5 pages).

Crocker, David H., "RFC822-Standard for the Format of ARPA Internet Text Messages", Aug. 13, 1982, Memorandum from Saved by Windows Internet Explorer 8, sent Tuesday, Dec. 22, 2009, CAP-j2 035695-CAP-j2 035733, (39 pages).

Date, C. J., "An Introduction to Database Systems", vol. II, Addison-Wesley Systems Programming Series, © 1983 by Addison-Wesley Publishing Company, Inc., ISBN 0-201-14474-3, COM-j2 002510-CCOM-j2 002557, (48 pages).

Davis, Jim, et al., ""Drop-In" Publishing with the World Wide Web", Xerox Inc. and Cornell University, Internet article: http://www.cs.cornell.edu/lagoze/papers/www.htm (Jun. 6, 2007), CAP-j2 035974-CAP-j2 035985, (12 pages).

Davis, James R., "A Server for a Distributed Digital Technical Report Library", Xerox Corporation, Design Research Institute, Cornell University, Ithaca, NY, USA, Jan. 15, 1994, CAP-j2 035986-CAP-j2 035993, (8 pages).

Davis, James R., "Creating a Networked Computer Science Technical Report Library", Cornell University, NY, USA, D-Lib Magazine, Sep. 1995, CAP-j2 036076-CAP-j2036080, (5 pages).

Davis, James R., "Dienst, A Protocol for a Distributed Digital Document Library", Dienst, Internet-Draft, Jul. 1994, CAP-j2 036081-CAP-j2 036094, (14 pages).

December, John, et al., "The Everything You Need to Master the Web!", Unleashed, Sams Publishing, (16 pages).

Deixler, Lyle, "Fax Forges Ahead", Teleconnect, Nov. 1996, v14 n11 p. 52(12), (5 pages).

Dougherty, Dale, et al., "The Mosaic Handbook for Microsoft Windows", Featuring The Global Network Navigator™, © 1994 O'Reilly & Associates, Inc., Sebastopol, CA, USA, Oct. 1994, ISBN: 1-56592-094-5, PRO037275-PRO037513, (239 pages).

Duffy, J., "IBM's SAA Gets Voice: Company to Expland Enterprise Networking Horizons", Computer Systems News, May 14, 1990, ( p. 1).

Edwards, Larry M., "E-Mail: Industry is Posting Impressive Gains", in San Diego Business Journal (Mar. 7, 1994), (pp. 1 and 17-18).

Fenn, Barry, et al., "Harmony on an Expanding Net", and Hermann Maurer, ACM Interactions (Oct. 1994), (pp. 27-38).

French, James C., et al., "Applying Hypertext Structures to Software Documentation", Information Processing & Management, An International Journal, Special Issue: Methods and Tools for the Automatic Construction of Hypertext, vol. 33, No. 2, 1997 (pp. 219-231), CAP-j2 033631-CAP-j2 033795, (16 pages).

French, James C., et al., "Hypertext Structures and Software Documentation", Technical Report CS-96-04, Department of Computer Science, University of Virginia, Feb. 1996, PRO039720-PRO039735, (16 pages).

French, James C., et al., "Hypertext Structures and Software Documentation", Technical Report CS-96-04, Department of Computer Science, University of Virginia, Feb. 1996, CAP-j2 033644-CAP-j2 033659, (16 pages).

French, Jim, et al., "Wide Area Technical Report Service—technical reports online", Aug. 2, 1994, CAP-j2 036205-CAP-j2 036210, (6 pages).

French, James C., et al., "Wide Area Technical Report Service: Technical Reports Online", Supporting Technologies, Communications of the ACM, Apr. 1995, vol. 38, No. 4, PRO039380, (1 page).

French, James C., et al., "Wide Area Technical Report Service: Technical Reports Online", Supporting Technologies, Communications of the ACM, Apr. 1995, vol. 38, No. 4, CAP-j2 033304, (1 page).

Gaines, Brian R., "Supporting Collaboration Through Multimedia Digital Document Archives", Version 1.0, Nov. 1994, Knowledge Science Institute, University of Calgary, Calgary, Alberta, Canada, CAP-j2 035877-CAP-j2 035929, (53 pages).

Halama, PHD, James R., et al., "An Interactive Electronic Bulletin Board Implementation for Mosaic and HTTP Server", EBBSMos.htm, CAP-j2 036201-CAP-j2 036204, (4 pages).

Hertzoff, Ira, "AT&T Global Messaging—The AT&T EasyLink Services Sourcebook", Chapter 6, © 1995 by Ira Hertzoff, ISBN 0-07-028459-8, COM-j2 000835-COM-j2 000877, (43 pages).

Hertzoff, Ira, "At&T Global Messaging—The AT&T EasyLink Services Sourcebook", Chapter 7, © 1995 by Ira Hertzoff, ISBN 0-07-028459-8, COM-j2 000878-COM-j2 000907, (30 pages).

Hertzoff, Ira, "AG&T Global Messaging—The AT&T EasyLink Services Sourcebook", Chapter 10, © 1995 by Ira Hertzoff, ISBN 0-07-028459-8, COM-j2 000908-COM-j2000940, (33 pages).

Hertzoff, Ira, "AT&T Global Messaging—The AT&T EasyLink Services Sourcebook", Chapter 11, © 1005 by Ira Hertzoff, ISBN 0-07-028459-8, COM-j2 000941-COM-j2 000975, (35 pages).

Hertzoff, Ira, "AT&T Global Messaging—The AT&T EasyLink Services Sourcebook", Chapter 12, © 1995 by Ira Hertzoff, ISBN 0-07-028459-8, COM-j2 000976-COM-j2 001012, (37 pages).

Hofmann, Peter, et al., "@INGate: Integrating Telephony and Internet", 1997 IEEE Conference on Protocols for Multimedia Sys., (pp. 261-264), PRO014692-PRO014695, (4 pages).

Hong, Jack, et al., "Personal Electronic Notebook with Sharing", Center for Design Research, Stanford University, Stanford, CA, USA, © 1995 IEEE, CAP-j2 033020-CAP-j2 033026, (7 pages).

Horton, Mark R., "Standard for Interchange of USENET Messages", RFC 850, Jun. 1983, Internet article: file:///Users/aporter/Counseling/Tmp/Send/NNTP/RFC%20850%20-%20Standard%20for%20interchange%of%20USENET%20messages.webarchive, CAP-j2 035734-CAP-j2 035752, (19 pages).

Hunt, Craig, "TCP/IP Network Administration", Help for UNIX System Administrators, O'Reilly & Associates, Inc., Sebastopol, CA, USA, © 1992 Craig Hunt, Jan. 1994, ISBN: 0-937175-82-X, PRO038179-PRO038446, (268 pages).

Jones, Kennie H., "Tops On-Line—Automating the Construction and Maintenance of HTML Pages", NASA Langley Research Center, Electronic Proceedings of the Second World Wide Web Conference '94: Mosaic and the Web, PRO042011-PRO042017, (11 pages).

Kaashoek, M. F., et al., "Dynamic Documents: Extensibility and Adaptability in the WWW", MIT Laboratory for Computer Science, Cambridge, MA, USA, Sep. 15, 1994, CAP-j2 036165-CAP-j2 036176, (12 pages).

Kahan, Russell, "Fax over IP", Focus—40 of 191 Documents, © 1997 Gale Group, Inc., Aug. 1, 1009, Section: Pg. p. 82(8) vol. V15 No. N8 ISSN: 0740-9354, COM-j2 005022-COM-j2 005032, (11 pages).

Kantor, Brian, et al., "Network News Transfer Protocol—A Proposed Standard for the Stream-Based Transmission of News", Network Working Group, Feb. 1986, Internet article: file:///Users/aporter/Consulting/Tmp/Send/NNTP/RFC%20977%20-%20Network%20News%20Transfer%20Protocol.webarchive, CAP-j2 035753-CAP-j2 035781, (29 pages).

Kasper, Theresa, "Untangling the Web—The Role of Text Retrieval in a Hypertext Environment", Development Manager, Information Dimensions, Inc., Internet article: file:///Users/aporter/Counseling/Tmp/Send/kasper/kasper.html, CAP-j2 035634-CAP-j2 035639, (6 pages).

Kinnucan, Paul, "What's New in the Fax World", Systems Integration, Feb. 1990, v23 n2 p. 50(7), (4 pages).

Kravitz, J., "SDML-Signed Document Markup Language", Financial Services Technology Consortium, W3C Note Jun. 19, 1998, downloaded from the Internet at www.23.org, on Jun. 19, 1998.

Kumar, Vinay, et al., "A SHAREd Web to Support Design Teams", Enterprise Integration Technologies Corp., Palo Alto, CA, USA, © 1994 IEEE, CAP-j2 032846-CAP-j2 032850, (5 pages).

Lagoze, Carl, et al., "Dienst: An Architecture for Distributed Document Libraries", Communications of the AMC, Supporting Technologies, Apr. 1995, vol. 38, No. 4 (p. 47), CAP-j2 036095, (1 page).

Lagoze, Carl, et al., "Dienst: Implementation Reference Manual", May 5, 1995, Ithaca, NY, USA, CAP-j2 036096-CAP-j2 036164, (69 pages).

Leffler, Samuel J., "FlexFAX—A Network-Based Facsimile Service", Silicon Graphics, Inc., Mountain View, CA, USA, Nov. 27, 1990, CAP-j2 032990-CAP-j2 032998, (9 pages).

Levine, Ron, "Surprise! Fax servers smarten up.", Datamation 63, vol. 41, No. 9, ISSN: 0011-6963, May 15, 1995, COM-j2 000823-COM-j2 000825, (3 pages).

Luotonen, Ari, et al., "CERN httpd Reference Manual—A Guide to a World-Wide Web HyperText Daemon", CERN Server User Guide, Generated from the Hypertext, May 4, 1994, PRO014696-PRO014777, (82 pages).

Lyle, J., "Internet Fax Software: Internet Fax Utility Offers Simplified Faxing to E-Mail Addresses", Lumina News, Sep. 3, 1996, downloaded from Internet at http://lumina2000.com/lumina/press93.html printed on Jun. 11, 1997.

Malamud, C., et al., "Principles of Operation for the TPC.INT Subdomain: General Principles and Policy". RFC 1530, Oct. 1993, PRO014790-PRO014796, (7 pages).

Malamud, C., et al., "Principles of Operation for the TPC.INT Subdomain: Remote Printing—Technical Procedures", RFC 1528, Oct. 1993, PRO014778-PRO014789,(12 pages).

Masinter, Larry, "Document Management, Digital Libraries and the Web", Jun. 9, 1995, Internet article: http://larry.masinter.net/docweblib.html, CAP-j2 033660-CAP-j2 033681, (22 pages).

McCusker, Tom, "Low-Cost Messaging the Lan Fax Way (Local Area Network) (Fax Servers) (Including Related Article on How to Figure How Big a Fax Server is Needed)", Datamation, 46, Jan. 1, 1992, © 1992 Cahners Publishing Co., COM-j2 000829-COM-j2000831, (3 pages).

Mendel, Brett, "Net Faxing Awaits Its Day", LAN Times, Dec. 9, 1996, v13 n27 p. 25, (2 pages).

Miller, Mark A., "Defusing TCP/IP-Based Internet Problems in Layers", Network World, Oct. 17, 1994, CAP-j2 035930, (1 page).

Morgenstern, David, "DynaWeb Server Holds SGML Books: Web Server Queries, Converts to HTML", in MacWeek, vol. 8, No. 28 at 12 (Jul. 11, 1994).

Myers, Jennifer, "Read-Comics", Announcement, Version 0.12, Jan. 18, 1994, CAP-j2 035685-CAP-j2 035688, (4 pages).

Myers, Jennifer, "Read-Comics", Announcement, Version 0.12, Jan. 18, 1994, PRO041761-PRO041764, (4 pages).

Myka, Andreas, "Putting Paper Documents in the World-WideWeb", Wilheim-Schickard-Institut, Universität Tübingen, Tübingen, Germany, 1994, CAP-j2 036177-CAP-j2 036186, (10 pages).

Nakagawa, et al., "Development of a Network Model for the Total Health Care Management of Multi-Vendor Environment, in Multimedia Communications", 1994, Multimedia '94, 5th IEEE COMSOC Int'l Workshop (workshop occurred May 16-19, 1994, (pp. 5/2/1-5/2/4).

Nakamura, D., "AT&T Introduces Most Comprehensive Fax-to-Data Service", dated Feb. 22, 1996, downloaded from Internet at http://www.att.com/press/0296/960222.ela.html on May 16, 1997.

Nelson, Michael L. et al., "Electronic Document Distribution: Design of the Annonymous FTP Langley Technical Report Server", NASA Technical Memorandum 4567, National Aeronautics and Space Administration, Langley Research Center, Virginia, USA, Mar. 1994, CAP-j2 033682-CAP-j2 033701, (20 pages).

Nelson, Michael L., et al., "The Widest Practicable Dissemination: The NASA Technical Report Server", © 1995 by the American Institute of Aeronautics and Astronautics, Inc., AIAA 95-0964, Computers in Aerospace 10, Mar. 28-30, 1995, San Antonio, TX, CAP-j2 033614-CAP-j2 033627, (14 pages).

Nelson, Michael L., et al., "The World Wide Web and Technology Transfer at NASA Langley Research Center", Proceedings of "The Second International World Wide Web Conference: Mosaic and the Web", Chicago, IL, USA, Oct. 19-21, 1994 (pp. 701-710), CAP-j2 033702-CAP-j2 033713, (12 pages).

Nelson, Michael L., et al., "World Wide Web Implementation of the Langley Technical Report Server", NASA Technical Memorandum 109162, Sep. 1994, National Aeronautics and Space Administration, Langley Research Center, Virginia, USA, CAP-j2 033744-CAP-j2 033774, (31 pages).

Nickerson, Gord, "WorldWideWeb: hypertext from CERN", Computers in Libraries, vol. 12, No. 11 (1992), (p. 75).

Orozco-Barbosa, L, et al., "Design and Performance Evaluation of Intelligent Multimedia Services", 1997 Elsevier Science, Computer Communications 20 (1997), (pp. 219-232).

Patel, Ahmed, et al., "A Technique for Multi-Network Access to Multimedia Messages", Elsevier, Computer Communications 20 (1997), Received Sep. 12, 1996; accepted Dec. 29, 1996, pp. 324-337, (14 pages).

Patel, Sanjiv P., et al., "The Multimedia Fax-MIME Gateway", IEEE MultiMedia, vol. 1, No. 4, published Winter 1994 ("Patel"), (pp. 64-70).

Patterson, David A., et al., "Computer Organization & Design—The Hardware/Software Interface", Second Edition, © 1998 by Morgan Kaufmann Publishers, Inc., San Francisco, CA, PRO014804-PRO014808, (5 pages).

Peck, J, et al., "MH & xmh, Email for USOIS & Programers", O'Reilly & Associates, Inc., Sebastopol, CA, 1995.

Plotkin, Helen, "The Forum Newsreader Plans", Apr. 5, 1994, Internet article: http://mathforum.org/kb/plaintext.jspa?messageID=1072645, CAP-j2 032999-CAP-j2 033000, (2 pages).

Pop, M., "Comparative Study of Electronic Mail Systems", May 30, 1994.

Postel, Jonathan B., "Simple Mail Transfer Protocol", Aug. 1982, Information Sciences Institute University of Southern California, California, USA, Internet article: http://dlg.krakow.pl/tabmail/rfc/rfc821.txt, (68 pages).

Putz, Steve, "Design and Implementation of the System 22 Document Service", Information Sciences and Technologies Laboratory, Palo Alto Research Center, Palo Alto, CA, USA, © 1988, 1989, 1990, 1991, 1992, 1993 Xerox Corporation, CAP-j2 032857-CAP-j2 032972, (116 pages).

Putz, Steve, "Interactive Information Services Using World-Wide Web Hypertext", Xerox Palo Alto Research Center, Palo Alto, CA, USA, Apr. 20, 1994, © 1994 Xerox Corporation, CAP-j2 033001-CAP-j2 033010, (10 pages).

Quinton, Reg, "Sendmail—Care and Feeding", UWO/Sendmail, Last Edit Mar. 24, 1992, Computing and Communications services, University of Western Ontario, London, Ontario, Canada, CAP-j2 035782-CAP-j2 035804, (23 pages).

Reilly, S. D., et al., "Increasing the Computational Potential of the World Wide Web", CS-96-02, Feb. 9, 1996, Department of Computer Science, School of Engineering and Applied Science, University of Virginia, Charlottesville, VA, USA, CAP-j2 033714-CAP-j2 033743, (30 pages).

Rose, Marshall T., "The Internet Message losing the Book With Electronic Mail", © 1993 by P T R Prentice-Hall, Inc., ISBN: 0-13-092941-7, PRO014933-PRO014980, (48 pages).

Rosenbaum, Daniel J., "The E-Mail Route to Fax", PC World, Jun. 1989, COM-j2 000015-COM-j2 000019, (5 pages).

Rush, D., "Announce: Voice Mail, Email & Fax Integration Over the Web", Google Groups: biz.nextnewprod. Mar. 19, 1996, http://groups-beta.google.com/group/biznextnewprod/msg/db3c129fdo394667?dmode+source, (Mar. 2, 2005).

Rush, D., "Announce: Voice Mail, Email & Fax Integration Over the Web", Google Groups: biz.nextnewprod. Mar. 25, 1996, http://groups-beta.google.com/group/biznextnewprod/msg/b85b59d49e92318b?dmode+source, (Mar. 2, 2005).

Savetz, Kevin, "Faxing from the Internet", Tricks of the Internet Gurus, Sams Publishing, El Production A 000377-El Production A000391, (15 pages).

Schockey, R., "Fax->E-Mail Plus Voice Continued", Google Groups, http://groups-beta.google.com/group/comp/dcom.telecom/msg/1a2c73a37bc90e6b?dmode=source (Dec. 28, 1995).

Schockey, R., "Fax->E-Mail Plus Voice Mail Also?", Google Groups, http://groups-beta.google.com/group/comp/dcom.telecom, (Dec. 28, 1995).

Schockey, R., "Fax->E-Mail Plus Voice Mail Also?", Google Groups, http://groups-beta.google.com/group/comp/dcom.telecom/msg/7db6ab0035e113c2?dmode=source (Dec. 28, 1995).

Scott, Jay, "The Perly Gateway", Version 0.1, Sep. 2, 1994, Memorandum dated Sep. 9, 1994, subject: README, CAP-j2 035621-Cap-j2 035627, (7 pages).

Sheng, Guo Z., et al., "Intranet-Based Mail Fax Gateway Technology", 1997 IEEE International Conference on Intelligent Processing Systems, Oct. 28-31, Beijing, China, 97TH8335 vol. 2 of 2, (pp. 1607-1611).

Silva, Mario J., et al., "The case for Design Using the World Wide Web", and Randy H. Katz, in 32nd ACM/EEE Design Automation Conference (1995).

Simeonov, Plamen L., et al., "@INGate: a distributed intelligent network approach to bridge switching and packet networks", ilmedia, Technische Universitat Ilmenau, Proceedings/6th International Conference on Computer Communications and Networks, Sep. 22-25, 1997, Las Vegas, Nevada, IEEE Computer Society PR., 1997, S. 358-363, DOI: 10.1109/ICCCN.1997.623336, (7 pages).

Spire, E., "Fax->E-mail", Google Groups, http://groups-beta.google.com/group/comp/acom/telecom, (Dec. 20, 1995).

Sreenivasan, S., "Cybertimes German Pop Singer Sets Sights on Virtual Office", Sep. 23, 1996, downloaded from The New York Times CyberTime website.

Stevens, Larry, "Now your PC can "read" your fax (products combining facsimile boards and optical character recognition)", Datamation, v38, n22, p. 79(2). Nov. 1, 1992, ISSN: 1062-8363, © 1992 Cahners Publishing Associates LP, (5 pages).

Sung, Francis P., et al., "Faxing Documents in HP MPower", Hewlett-Packard Journal, Apr. 1994, CAP-j2 032973-CAP-j2 032981, (9 pages).

Symoens, Jeff, "Lotus' InterNotes Web Publisher Speeds Migration to the Web", First Looks, InfoWorld, Apr. 24, 1995, Internet Utility, (1 page).

Tanenbaum, Andrew S., "Computer Networks", Third Edition, © 1996 by Prentice Hall PTR, ISBN: 0-13-349945-6, PRO014992-PRO015026, (35 pages).

Taylor, John, "Building FAX into Computer Telephony Applications", Fax Overview, GammaLink, Computer Telephony Expo 1995, CAP-j2 033796-CAP-j2 034028, (233 pages).

Thomas, Dr., Rebecca, "Hands-On: Wizard's Grabbag Getting a Bang Out of Unix—Automatically generating temporary files, saving money by sending e-mail in batches, and revisiting the rounding error in ap", UnixWorld's Open Computing, UNXW, Jan. 1, 1994, vol. 11, No. 1, © 1994 McGraw-Hill, Inc., CAP-j2 035943-CAP-j2 035947, (5 pages).

Tomaru, "Electronic Mail Systems", 1983, Japan Annual Review in Electronics, Computers and Telecommunications, vol. 9, Telecommunication Technology, (pp. 283-290).

Toyoda, K., et al., "A Simple Mode of Facsimile Using Internet Mail", Network Working Group, Mar. 1998, RFC 2305, Internet article: http://www.elook.org/computing/rfc/rfc2305.txt, (13 pages).

Vanheyningen, Marc, "New Services: The Unified CS TR Index", Computer Science Dept., Indiana University, Thu, May 20, 1993, Message-id: http://ksi.cpsc.ucalgary.ca/archives/WWW-Talk/www-talk-1993q2.messgaes/362.html, CAP-j2 036188-CAP-j2 036189, (2 pages).

Vanheyningen, Marc, "The Unified Computer Science Technical Report Index: Lessons in Indexing Diverse Resources", Computer Science Department, Indiana University, UCSTRI Paper for WWW94 Chicago, Internet article: http://www.cs.indiana.edu/ucstri/paper/paper.html, CAP-j2 036193-CAP-j2 036200, (8 pages).

Varela, Carlos A., et al., "Providing Data on the Web: From Examples to Programs", Department of Computer Science, University of Illinois at Urbana-Champaign, URL: http://fiaker.ncas.uiuc.edu:8080/WWW94-2/paper.html, CAP-j2 033775-CAP-j2 033786, (12 pages).

Vetter, Ronald J., et al., "Mosaic and the World-Wide Web", Oct. 1994, CAP-j2 033011-CAP-j2 033019, (9 pages).

Weber, Jay C., "The Webmaster's Starter Kit", Memorandum from Saved by Windows Internet Explorer 8, sent Tuesday, Dec. 22, 2009, CAP-j2 035948-CAP-j2 035951, (4 pages).

Yu, Shung-Foo, et al., "A Multimedia Gateway for Phone/Fax and MIME Mail", Elsevier, Computer Communications 20 (1997), pp. 615-627, COM-j2 000020-COM-j2 000032, (13 pages).

* cited by examiner

SCALABLE ARCHITECTURE FOR TRANSMISSION OF MESSAGES OVER A NETWORK

This application is a continuation of U.S. continuation application Ser. No. 11/341,408, filed Jan. 26, 2006, entitled "Scalable Architecture for Transmission of Messages Over a Network", which is a continuation of application Ser. No. 10/393,227, filed Mar. 20, 2003 (now U.S. Pat. No. 7,020,132), which is a continuation of U.S. application Ser. No. 09/097,307, filed on Jun. 12, 1998 (now U.S. Pat. No. 6,597,688).

BACKGROUND OF THE INVENTION

1. Field of the Invention

The present invention relates to the field of message receipt/transmission and delivery using computer, phone, wireless and other communications networks. Specifically, the present invention relates to the transmission of e-mail messages which may be text only, text plus an audio file, text plus a video file, text plus a fax file or any combination thereof to a phone, pager or fax machine or other receiving device suitable for the message content, over appropriate communications networks using an architecture which enables easy expansion to handle additional message traffic as well as to connect to additional communications networks, including networks which do not presently exist which may become available in the future.

2. Description of Related Art

Voice and data communications systems such as the public switched telephone network (PSTN) are currently used to transfer image and text data transmitted by facsimile ("fax") machines in addition to the normally carried voice traffic. These faxed images are usually transmitted through the PSTN and received for printout or storage of the image on a destination fax machine or computer for the use by the recipient.

In U.S. Pat. No. 6,208,638 entitled Method and Apparatus for Transmission and Retrieval of Facsimile and Audio Messages Over a Circuit or Packet Switched Network, it is disclosed that to provide for the receipt and transmission of audio and fax information by a first user over a circuit switched network such as the public switched telephone network (PSTN) to a second user over a packet switched network such as the Internet, a communications server is connected both to the circuit switched network and a packet switched network.

The communications server contains resources receive and process incoming audio and facsimile calls from the circuit switched network into a format suitable for transmission over the packet switched network to the second user's address. In addition, a link is first determined between the second user's address on the circuit switched network and the second user's address on the packet switched network, and then an appropriate route to the second user's address on the packet network is determined. With the system being maintained in a distributed and redundant fashion, reliable receipt and transfer of all messages is ensured. A copy of the specification and drawings of U.S. Pat. No. 6,208,638 is attached hereto.

However, the architecture utilized as described in U.S. Pat. No. 6,208,638 is not easily scalable to handle increasingly higher levels of message traffic or to easily connect to networks in addition to the PSTN and the Internet. FIG. 1 shows the essence of the architecture of U.S. Pat. No. 6,208,638. An e-mail message is passed to an outbound resource 11 (communications server 550 in U.S. Pat. No. 6,208,638) which converts the e-mail message to a fax format or to audio for transmission to a fax machine or telephone connected to the PSTN. A database 13 stores customer information necessary for processing of messages (an unnumbered part of communications server 550 in U.S. Pat. No. 6,208,638 which is also contained in database server 595 in U.S. Pat. No. 6,208,638). After processing of an e-mail message by outbound resource 11, a fax or voice mail message is sent over the PSTN or more generally, a generalized switched telephone network (GSTN) which includes cellular telephone networks as well as the PSTN. Optionally, a pager message may also be sent informing a user of the fax which has been sent or availability of a voice mail message as described in U.S. Pat. No. 6,073,165 entitled Processing and Forwarding Messages From a Computer Network to a Forwarding Service.

SUMMARY OF THE INVENTION

A method and apparatus is disclosed for delivering messages that utilizes a message queue and a router/filter within a private data network. The private network is connected to an external data network such as the Internet, and has separate outbound resource servers to provide a high degree of scalability for handling a variety of message types.

QUAKED DESCRIPTION OF THE INVENTION

The present invention provides a method and apparatus for allowing the receipt and transmission of audio, video and fax information between a circuit switched network and a packet switched network. For purposes of explanation, specific embodiments are set forth to provide a thorough understanding of the present invention. However, it will be understood by one skilled in the art, that the invention may be practiced without these details. Further, although the present invention is described through the use of circuit switched and packet switched networks, most, if not all, aspects of the invention apply to all networks in general. Moreover, well-known elements, devices, process steps and the like are not set forth in detail in order to avoid obscuring the present invention.

Figure 1:
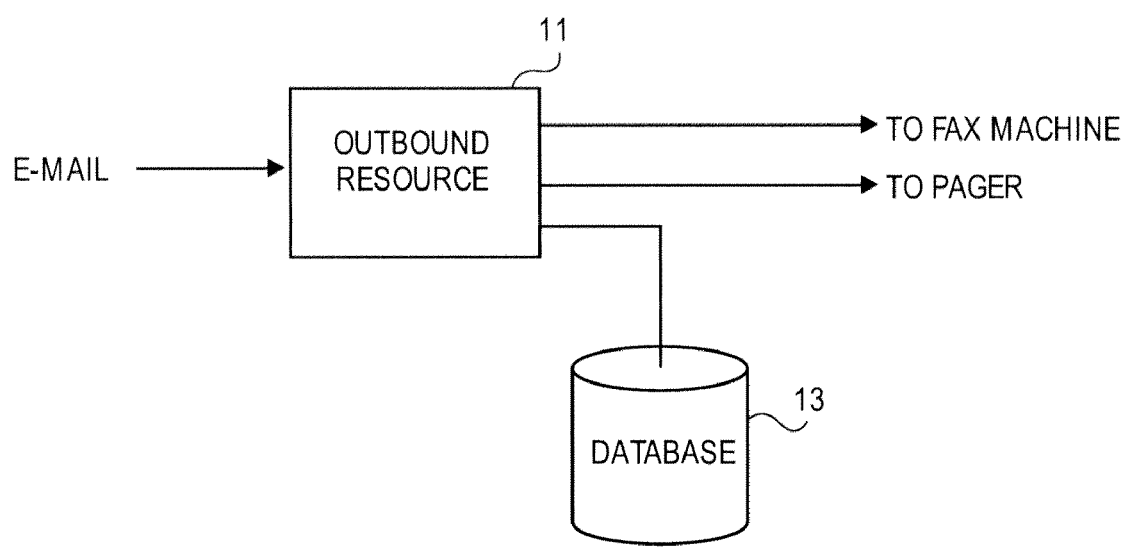
FIG. 1 is a block diagram of a prior art architecture which performs the functions, but not the scalability of the architecture of the present invention.
Figure 2:
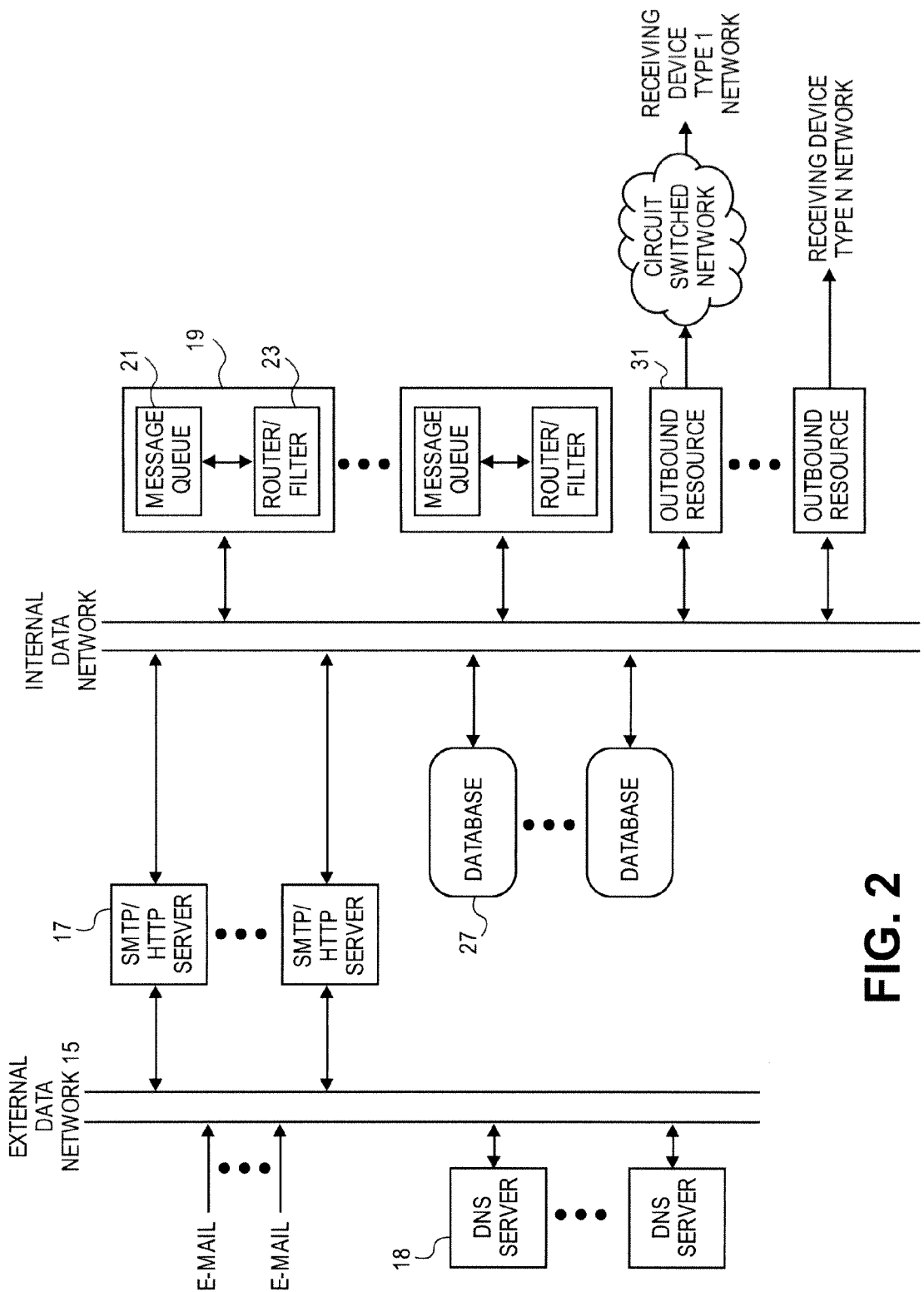
FIG. 2 is a block diagram illustrating the architecture of the present invention.

Referring now to FIG. 2, e-mail messages for a customer are sent to/through an external data network 15 (e.g., the Internet) and routed to an appropriate SMTP/HTTP (or SHTTP) server 17 as determined by a domain name server (DNS) 18 according to well known techniques. The e-mail message may be a text message or it may include a file, the content of which may be audio, video or bitmapped (e.g., a fax) or other data. Again, the techniques for creating and sending e-mail messages with these characteristics are well known.

A processing server 19, which includes a message queue 21 and a router/filter 23 first verifies that the message is from or is to a customer using information in database 27. After successful verification, the message is broken into fragments (in the case of files with multiple attachments) and written to message queue 21. Router/filter 23 obtains messages from the message queue and handles least call routing/billing/prioritization/filtering of messages. Filtering is primarily for notification messages for pager delivery. After billing verification and determination of a least cost route, the message is assigned to one or more outbound resources 31 for delivery to the intended recipient by a method or methods selected by the customer as previously recorded in database 27.

In the case of faxes, the outbound resource is a server which dials the destination fax number and sends the fax.

In the case of voice messages, the outbound resource is a server which dials the destination telephone number and plays the voice message.

In the case of notification messages, the outbound resource is a server which dials out to the paging terminal or delivers the notification message through any appropriate paging gateway.

After the message (in whatever form) has been delivered, a receipt with details and an error log (if any) is sent back via a secure protocol to the message queue 21.

The receipt/error log messages are then processed by the router/filter which interfaces with a billing system (not shown) for customer account update.

Figure 3:
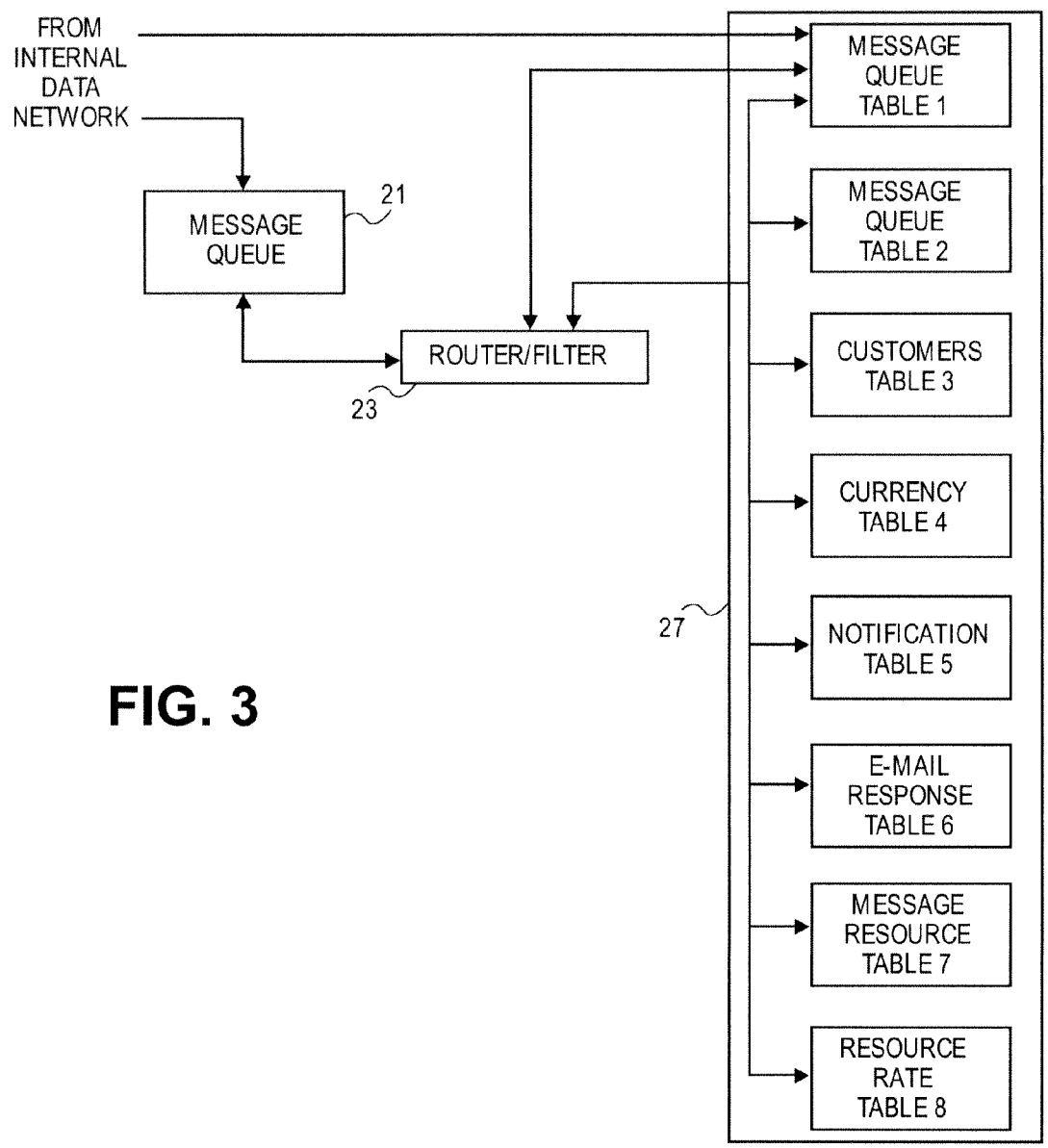
FIG. 3 is a block diagram showing the data/control through message queue 21, router/filter 23 and database 27.

FIG. 3 is a block diagram showing the data/control flow through message queue 21, router/filter 23 and database 27 using information contained in the following tables as explained with reference to FIGS. 4a and 4b.

TABLE 1

Message Queue Table

| | |
|---|---|
| MESSAGE_ID | This is a number assigned to each message that arrives in the system. |
| RESOURCE_ID | Unique number assigned to each Outbound Resource |
| RESOURCE_TYPE | Each Resource is identified by the type of messages it can deliver (e.g., FAX, VOICE, NOTIFY, etc.) |
| RESOURCE_ADDRESS | Location of the Resource (such as IP address) |
| MESSAGE_TO_EMAIL_ADDRESS | To: address of the message |
| MESSAGE_FROM_EMAIL_ADDRESS | From: address of the message |
| MESSAGE_LOCATION | Location of actual message on the Message Queue 21 |
| MESSAGE_SIZE | Size of the message in bytes |
| MESSAGE_PRIORITY | Priority of the message (e.g., low, medium, high) |
| MESSAGE_CREATION_DATE | Timestamp identifying the date/time that the message was received by the system |
| MESSAGE_EXPIRY_DURATION | Amount of time after which the message becomes stale |
| MESSAGE_SCHEDULED_DATE | Scheduled delivery timestamp for the message |
| MESSAGE_STATUS | Current status of the message (Active, Pending, Sent, etc.) |
| MESSAGE_ESTIMATED_COST | Estimated cost for the delivery of the message |
| CUSTOMER_KEY | Unique number identifying the customer in the database |
| MESSAGE_PART_OF_BROADCAST | Flag identifying if the message is part of a larger broadcast list waiting to be delivered |
| BROADCAST_ID | Unique number identifying a broadcast list |
| COVERPAGE_ID | Unique number identifying a coverpage (if any) for a fax |
| MESSAGE_SUBJECT | Subject line of the message to be delivered |
| MESSAGE_DURATION | Duration of the message (delivery time of fax, or delivery time for a voice message, etc.) |
| MESSAGE_RATE | Rate for message delivery (dollars per second, etc.) |
| MESSAGE_SEND_DATE | Actual timestamp identifying when the message was delivered |
| MESSAGE_REMOTE_CSID | Identifier of the fax machine to which a FAX message was delivered |
| MESSAGE_TYPE | Type of message (e.g., FAX, VOICE, NOTIFICATION, etc.) |
| RESOURCE_COMMUNICATION_TYPE | Protocol used to communicate with the resource (HTTP, SHTTP, etc.) |
| MESSAGE_LANGUAGE_CODE | Language used for delivery of a receipt or response, based on settings in the customer table |
| MESSAGE_PAGES | Number of pages of a message (used primarily for a fax) |

TABLE 2

File Type Table

| | |
|---|---|
| FILETYPE_MESSAGE_TYPE | Identifier of a message type (FAX, VOICE, etc.) |
| FILETYPE_RESOURCE_TYPE | Identifier to determine a resource that can handle a particular file type |
| FILETYPE_EXTENSION | The filename extension that identifies a file type (e.g., WAV, TIF, JFX, AU, GSM, etc.) |

TABLE 3

Customer Table

| | |
|---|---|
| CUSTOMER_KEY | Unique number identifying a customer in the database |
| FIRSTNAME | First name of customer |
| LASTNAME | Last name of customer |
| COMPANY | Company name of customer |
| ADDRESSLINE1 | Company address |
| ADDRESSLINE2 | Company address |
| CITY | Company city |
| MAILREGION | Company state or equivalent |
| MAILCODE | Zipcode or equivalent |
| COUNTRY | Company country |
| WORKNUMBER | Customer work phone number |
| HOMENUMBER | Customer home phone number |
| EMAILADDRESS | Email address of customer |
| COLLECTIONMETHOD | Collection method such as Credit card, Debit, etc. |
| BILLTYPE | e.g., Customer, Demo, free, corporate, etc. |
| STATUS | Status of customer, Active, Inactive, etc. |
| LANGUAGECODE | Language of customer, English, German, etc. |
| CURRENCYCODE | Currency for billing the customer, US Dollars, Pound Sterling, etc. |

TABLE 4

Currency Table

| | |
|---|---|
| FORMAT | Currency label |
| CURRENCY_SYMBOL | Symbol for currency |

TABLE 5

Notification Table

| | |
|---|---|
| CUSTOMERKEY | Unique number identifying a customer in the database |
| PAGERTYPECODE | Code to determine the kind of pager service |
| BBSNUMBER | Modem number for pager notification delivery, based on the pager type |
| PAGERNUMBER | Identifier number of the pager unit |
| PIN | PIN code for the pager unit |
| DISPLAYTYPE | Display type of the pager (numeric, alphanumeric, etc.) |

TABLE 6

Response_email Table

| | |
|---|---|
| RESPONSE_ID | Unique ID for a response/receipt message to be sent to a customer |
| REPONSE_SUBJECT | Subject line of the response message |
| RESPONSE_FROM_EMAIL | From: line of the response message |
| RESPONSE_BODY | Actual text of the response message |

TABLE 7

Resource Table

| | |
|---|---|
| RESOURCE_ID | Unique identifier for the resource |
| RESOURCE_TYPE | Type of resource (FAX, VOICE, etc.) |
| RESOURCE_STATUS | Status of resource (Active, Inactive, etc.). |
| RESOURCE_QUEUE_STATUS | Status of the Queue, number of messages in queue |
| RESOURCE_TIME_ZONE | Time zone for the resource |
| RESOURCE_QUEUE_MAX | Maximum size of the resource queue |
| RESOURCE_ADDRESS | Address of the resource (IP address, etc.) |
| RESOURCE_NAME | Name of the resource |
| RESOURCE_EXPIRY_DURATION | Expiry duration for any message sent to the specified resource |
| RESOURCE_QUEUE_IN_STATUS | Number of messages waiting to be delivered by the resource |
| RESOURCE_COMMUNI-CATION_TYPE | Method used to communicate with resource (HTTP, SHTTP, etc.) |

TABLE 8

Resource Rates Table

| | |
|---|---|
| RESOURCE_ID | Unique identifier for the resource |
| RESOURCE_PREFIX | Any digits to be dialed before an actual number |
| RESOURCE_CITY_NAME | Name of destination city for the message to be delivered |
| RESOURCE_PROVIDER_RATE | Rate for a particular city (dollars per second, etc.) |
| RESOURCE_MAX_DIGITS | Max number of digits allowed to be dialed |
| RESOURCE_AREA_CODE | Area code for the particular city |

Figure 4A:
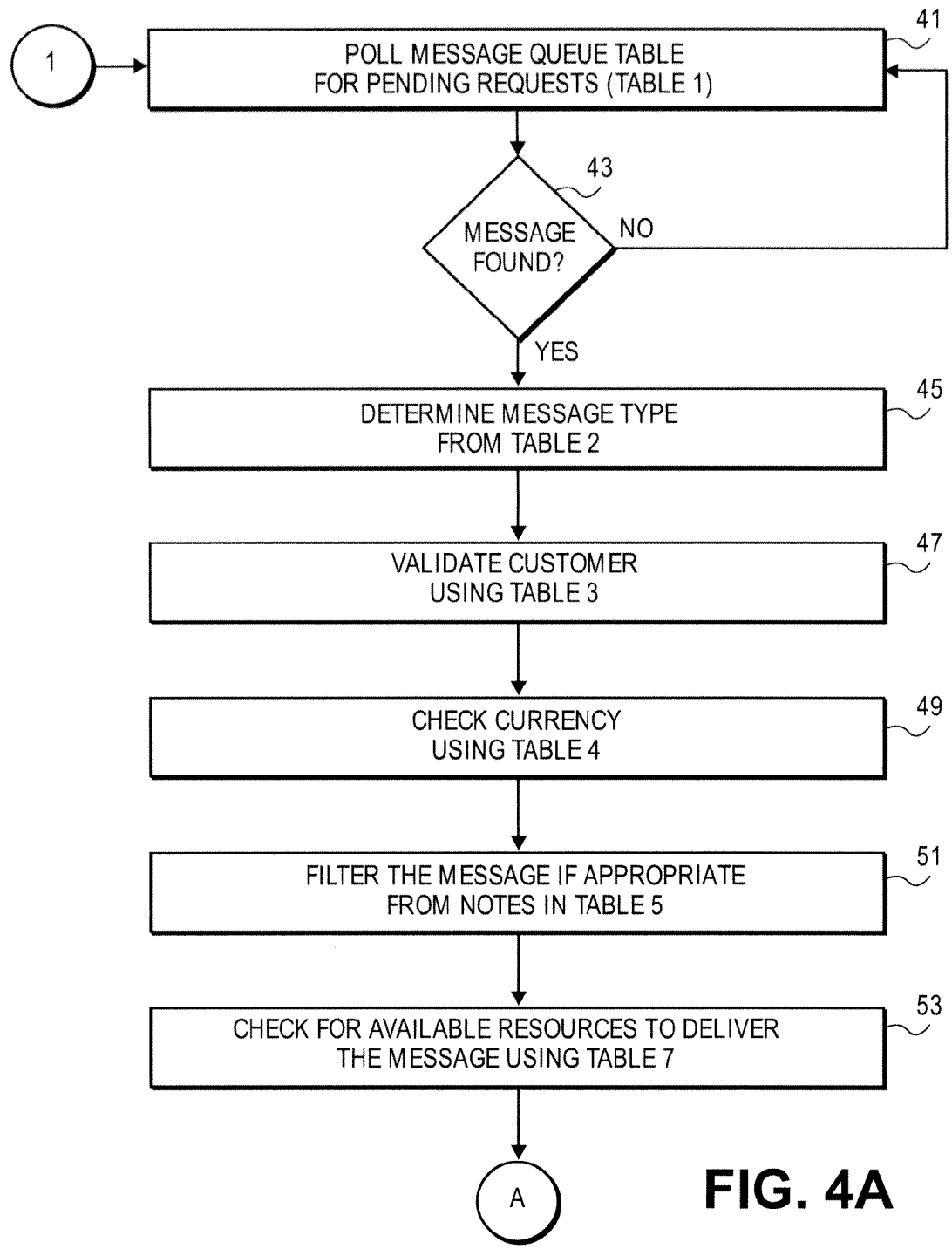
FIG. 4 (4a and 4b) is a flow diagram of the processing performed by router/filter 23.
Figure 4B:
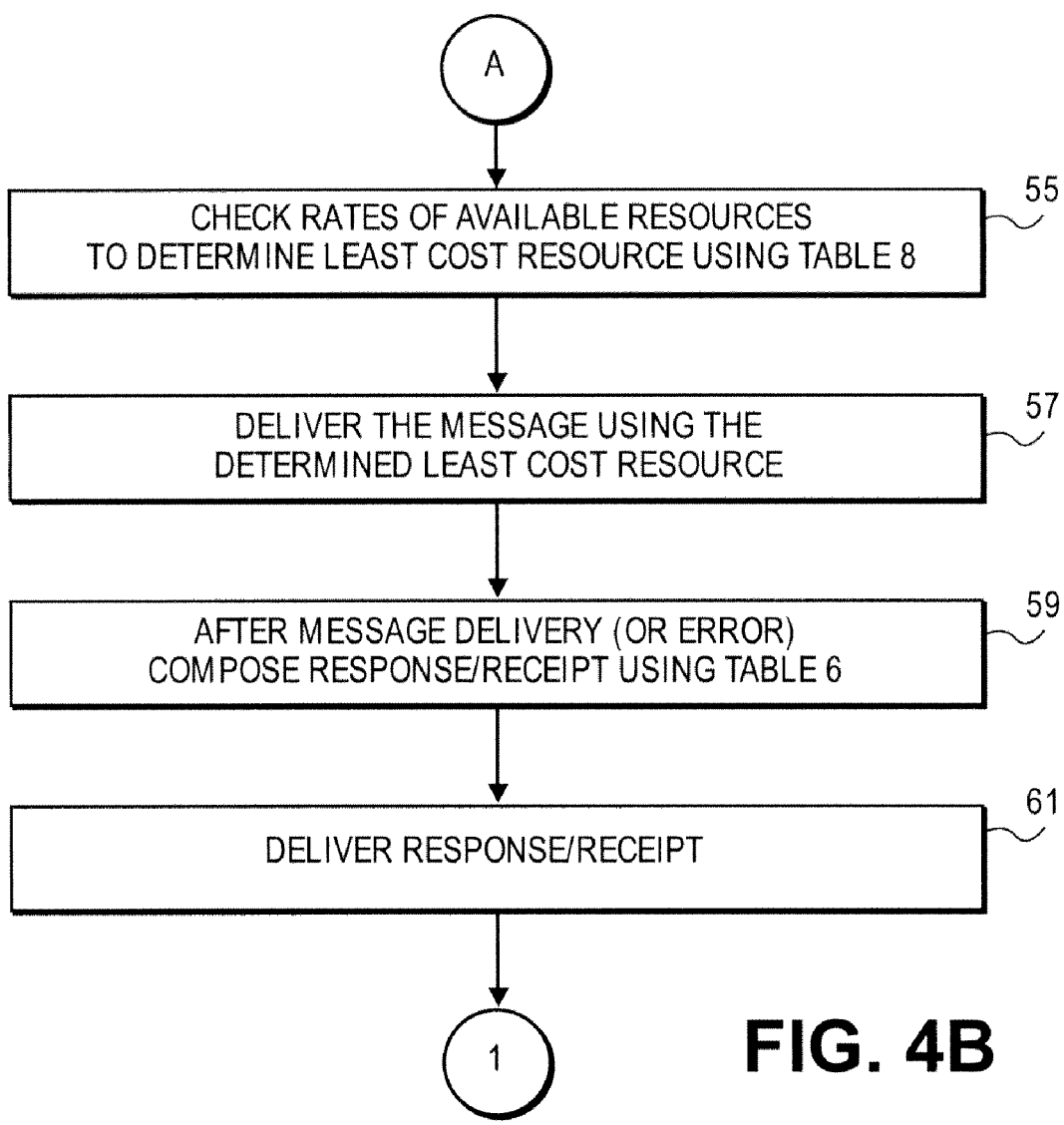

FIGS. 4a and 4b are a flow diagram of the processing performed by router/filter 23 using Tables 1-8. When a message is received it is placed into message queue 21 which is simply a storage area, the specifics of which, including the mechanism for placing the message into the queue are well known. Certain details concerning the message are also stored in a message queue table (Table 1). In step 41, router/filter, which is a computer program running on processing 19, polls the message queue table for pending requests as determined by the existence of an active message in the message status field. If no message is found, after a system defined delay, the message queue table is again polled (step 43). Once a message has been found in the table, processing continues with step 45 by determining the message type using the message_type field in Table 1 and the file type information in Table 2. The customer is then validated using information in Table 3 in step 47. In step 49, currency information for the customer is obtained from Table 4. The message is then filtered for possible pager notification using the information in Table 5 in step 51. In step 53, Table 7 is used to check for available resources to deliver the message. In step 55, the rates of available resources are checked to determine the least cost resource using Table 8. Then in step 59, the message is delivered using the determined least cost resource. After the message has been delivered, or after an error in the delivery has occurred, in step 59, a response/receipt is composed using Table 6. In step 61, the response or receipt is delivered to the sender. The system then begins the process over again at step 41.

As noted above outbound resource 31 is equivalent to communications server 550 as described in U.S. Pat. No. 6,208,638. The modifications made to outbound resource to enable it to operate in a system having an architecture as described herein are as follows.

These changes will be described with reference to the message structure of received messages.

Message Structure

Each field has a value following an '=' sign and is terminated by a newline character. The exception to this is the "Message" field where a newline immediately follows the '=' sign and the actual age follows on the next line.

The fields of a message are as follows:

Password=
MessageID=
MessageStatus=
MessageSentTimeStamp=
MessageDuration=
MessageLength=
MessageRemoteCSID=
MessageSourceCSID=
MessageAttachStatus=
MessageDestination=
ResourceID=
ResourceStatus=
ResourceLastCommTimeStamp=
ResourceExpiryDuration=
ResourceQueueInStatus=
ResourceQueueOutStatus=
ResourceChannelMax=
ResourceChannelStatus=
MessageBoundary=
Message=

In the following explanation of the above fields, the text in brackets at the end indicates the entity providing the value for the field in the forward/reverse direction (i.e., from router/filter 23 (RF) to outbound resource 31 (RESOURCE), and from RESOURCE to RF, respectively). "NA" indicates that no value is applicable, and the text "NA" is used to populate the field. "Same" indicates that the same value is used in the reverse direction, i.e, the RESOURCE does not modify the value; it only echoes the value it receives in that field.

Password—There is a fixed password pair for each RESOURCE and RF combination. RESOURCE stores the RF password in a flat text password file in a directory (jfaxom), and RF stores the RESOURCE password in the database. (RF/RESOURCE).

MessageID—Unique ID, per message, generated by RESOURCE. (RESOURCE/Same).

MessageStatus—Code indicating current status of the message. See Status codes below. (RF/RESOURCE)

MessageSentTimeStamp—Time stamp indicating date/time the message was delivered to the final destination by RESOURCE. (NA/RESOURCE)

MessageDuration—Time (in seconds) to transmit message from RESOURCE. (NA/RESOURCE)

Messagelength—Number of pages transmitted by RESOURCE. (NA/RESOURCE)

MessageRemoteCSID—called subscriber identification (CSID) of fax machine to which message was transmitted. (NA/RESOURCE)

MessageSourceCSID—Source CSID. This may be customized per customer. (RF/Same)

MessageAttachStatus—Value of "A" indicates a message is attached for delivery. (RF/RESOURCE)

MessageDestination—Destination phone number. (RF/Same)

ResourceID—Unique ID, per resource, stored in the database. (RF/Same)

ResourceStatus—Code indicating the current status of the resource, i.e., whether it is active or not. RF uses this to determine whether further messages should be sent to RESOURCE for delivery. See Status codes below. (NA/RESOURCE)

ResourceLastCommTimeStamp—Date/time of last communication between RF and RESOURCE. (RF/RESOURCE)

ResourceExpiryDuration—Life of message (in minutes) on RESOURCE. If a message has not been delivered to the final destination by RESOURCE within this amount of time, the message is considered "expired" and is discarded.

ResourceQueueInStatus—Number of messages waiting to be processed in an Inbox directory on RESOURCE. (NA/RESOURCE)

ResourceQueueOutStatus—Number of messages waiting to be processed in an Outbox directory on RESOURCE. (NA/RESOURCE)

ResourceChannelMax—Number of channels available for use on RESOURCE. (NA/RESOURCE)

ResourceChannelStatus—Channel activity status, e.g., 0000000111000001, where 0's indicate an idle channel and 1's indicate a busy channel. (NA/RESOURCE)

MessageBoundary—Text for MIME boundary. (RF/NA)

Message—Actual MIME message sent by RF. If MessageAttachStatus=NA, no message follows this tag.

All fields are NA if not used.

Date fields are expressed in MMDDYYhhmmss format.

Resource Status Codes are:
A—Active
I—Inactive

Message Status Codes are:
P—Pending
H—On Hold
D—Deferred
R—Ready for sending to RESOURCE
X—Exchanged, i.e., sent to RESOURCE but not acknowledged by it
A—Sent to RESOURCE and acknowledged by it.
S—Sent (i.e., receipt for final delivery received from RESOURCE)

Normal sequence for Message delivery by RESOURCE is:

RF receives a request in its queue (message queue 21).

RF sends the message to RESOURCE.

RESOURCE gets message, authenticates password, and creates a new message in the Inbox directory.

RESOURCE acknowledges receipt of message.

RESOURCE processes the message in Inbox (MessageStatus=A, MessageAttachStatus=A).

RESOURCE moves message to a Process directory for further processing.

RESOURCE finishes processing message and delivers it to final destination.

RESOURCE removes the message from the Process directory.

RESOURCE creates a message in Outbox directory. (MessageStatus=S). If a "reply message" is to be delivered to the original sender, MessageAttachStatus=A, else MessageAttachStatus=NA. MessageID remains the same in either case.

RESOURCE delivers receipt (with "reply message," if applicable) to RF.

RF receives the message and puts it in the Queue for database processing.

Processing server 19 with the above described functionality may be implemented using readily available systems such as a Windows NT server or a UNIX server. Database 27 may be implemented as a database server using readily available systems such as a Windows NT server or a UNIX server running, for example a SQL database.

Figure 5:
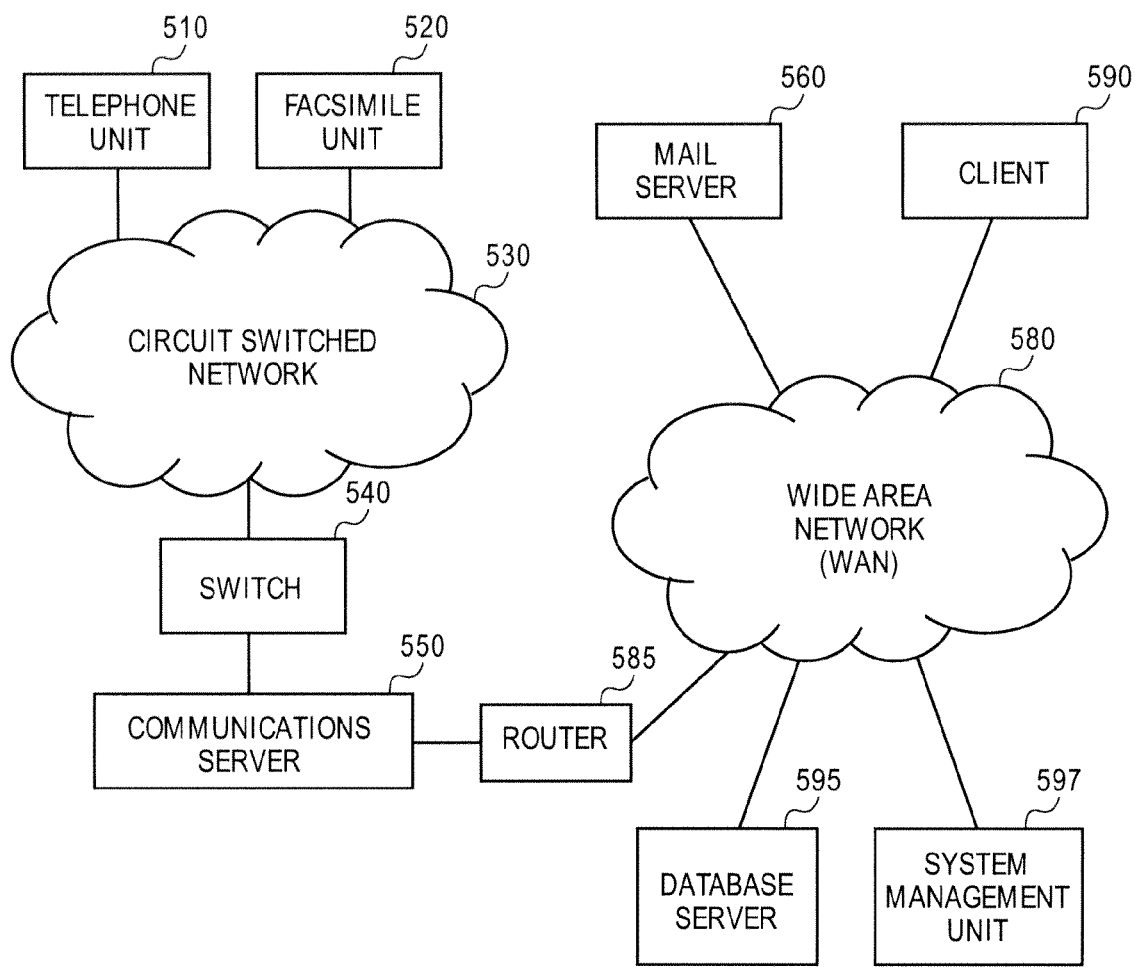
FIG. 5 is a system diagram of a network containing a message server.
Figure 6:
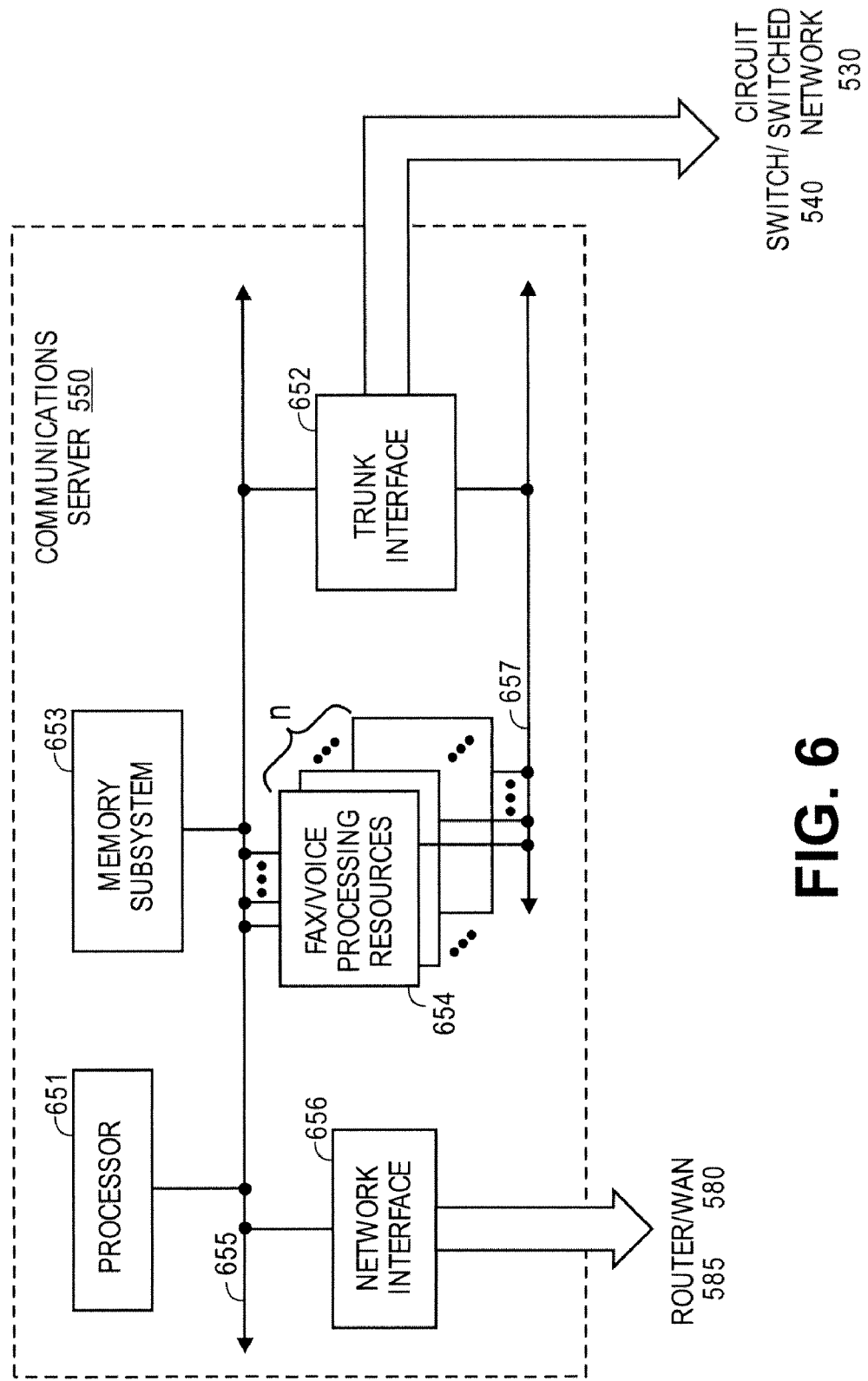
FIG. 6 is a block diagram illustrating the message server.
Figure 7:
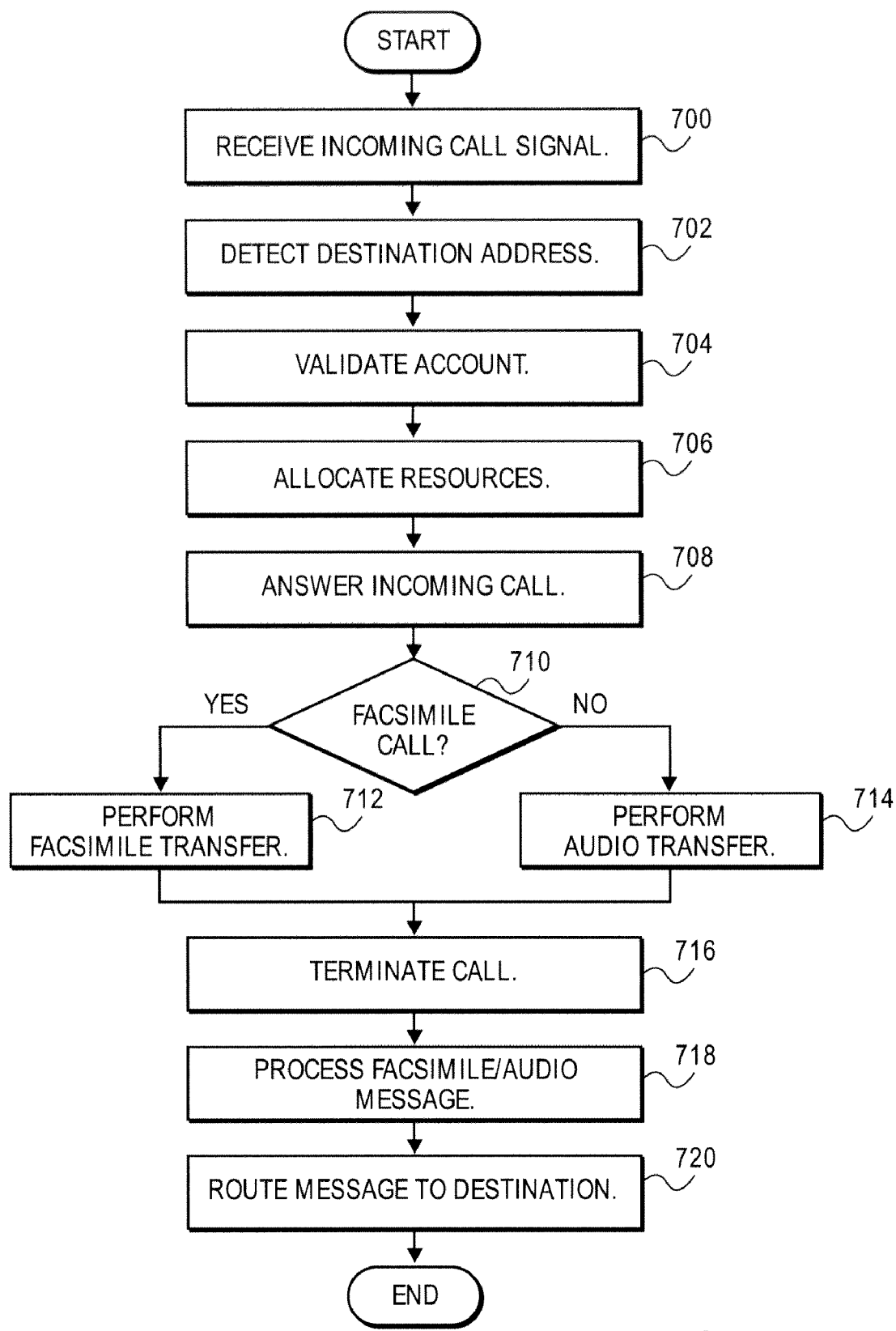
FIG. 7 is a flow diagram illustrating some operations.

What follows is a detailed description of FIGS. 5-7 which set forth a method and apparatus for allowing the receipt and transmission of audio and fax information between a circuit switched network and a packet switched network, as described in U.S. Pat. No. 6,208,638. For purposes of explanation, specific embodiments are set forth to provide a thorough understanding of the present invention. However, it will be understood by one skilled in the art, from reading this disclosure, that the invention may be practiced without these details. Further, although the system is described through the use of circuit switched and packet switched networks, most, if not all, aspects apply to all networks in general.

FIG. 5 contains a block diagram illustrating an embodiment of a system containing a communications server 550 connected to a circuit switched network 530 and a wide area network (WAN) 580. In an embodiment, the circuit switched network 530 is a circuit switched network such as the PSTN while WAN 580 is a packet switched network such as the Internet. It is to be noted that circuit switched network 530 can also be a network such as the generalized switched telephone network (GSTN), which encompasses PSTN networks, cellular telephone networks, and the other networks with which they are in communication.

Communications server 550 is connected to circuit switched network 530 via a switch 540 and to WAN 580 through the use of a router 585. As described in further detail below, in an embodiment, switch 540 and router 585 are interfaced to communications server 550 using two separate hardware interfaces. In an alternate embodiment, switch 540 and router 585 can be interfaced to communications server 550 through the use of one hardware unit.

Connected to circuit switched network 530 is both a telephone unit 510 and a facsimile unit 520. Telephone unit 510 is a standard telephone capable of converting audio signals into electrical signals suitable for transmission over circuit switched network 530. Similarly, facsimile unit 520 is a standard facsimile machine capable of transmitting and receiving facsimile messages over circuit switched network 530. Each of these devices can be connected to circuit switched network 530 using either wired or wireless technology.

Connected to WAN 580 is a database server 595, a system management unit 597, a mail server 560, and a client 590. Each of these systems communicate with each other and with communications server 550 via WAN 580 using such protocols such as simple network management protocol (SNMP) and hyper-text transport protocol (HTTP)—packetized using a protocol such as the transmission control protocol/internet protocol (TCP/IP).

In an embodiment, each one of database server 595, system management unit 597, mail server 560, and client 590, are stand-alone computers or workstations containing the hardware and software resources to enable operation. In alternate embodiments, the functions provided by each one of database server 595, system management unit 597, mail server 560, and client 590, are provided by any number of computer systems.

In an embodiment, mail server 560 is a server providing e-mail receipt and transmission using a protocol such as the simple mail transfer protocol (SMTP) and post office protocol (POP). Moreover, client 590 is configured to be able to communicate over WAN 580 using SMTP or POP in order to retrieve e-mail from mail server 560 or another suitably configured server.

System management unit 597 communicates with communications server 550 to monitor: (1) the processes on communications server 550; (2) the status of the trunk line connected to communications server 550; and (3) the connection between the various servers connected to WAN 580. As described below, if any processes on communications server 550 or connection to the circuit switched network 530 is interrupted, system management unit 597 can allocate resources, or cause the re-routing of a call or message via one or more redundant resources or connections, ensuring that the call or message is routed to the final destination.

Communications server 550 contains user data needed to receive and route incoming messages received from circuit switched network 530. The same information is also stored on database server 595. In an embodiment, communications server 550 stores an inbound address, a set of final destination addresses; and an account status for each user. The inbound address corresponds to the telephone number assigned to the user. As further discussed below, the inbound address is the number that a message sender dials on telephone unit 510 or facsimile unit 520 to leave a message for the user. The set of final destination address contain one or more e-mail addresses where the user account status information indicates whether the inbound address is either active and or inactive—i.e, whether the user is able to receive messages using the system.

Database server 595 stores a duplicate copy of the inbound address, the set of final destination addresses; and the account status for each user. Database server 595 also stores additional information for each user such as mailing address and billing information which are not used in the operation of the present invention but are note herein for completeness only. Thus, the information that is stored on communications server 550 is a subset of the information that is stored on database server 595, and if communications server 550 were to become inoperable or otherwise unable to handle incoming messages, database server 595 can configure another communications server to accept those calls.

In an embodiment, system management unit 597 is responsible for monitoring the status of communications server 550 and re-assigning the users being handled by communications server 550 if communications server malfunctions or becomes overloaded with incoming calls. In the former case, system management unit 597 would re-assign all users being handled by communications server 550 to another communications server. In the latter case, system management unit 597 would only off-load the only those incoming calls for which communications server 550 does not have the available resources to process.

FIG. 6 is a block diagram of communications server 550 configured in accordance with an embodiment containing a processor 651 coupled to a memory subsystem 653 through the use of a system bus 655. Also coupled to system bus 655 is a network interface 656; a trunk interface 652; and a set of fax/voice processing resources 654. Set of fax/voice processing resources 654 and trunk interface 652 are also coupled to a bus 657.

Bus 657 is a bus that supports time division multiplex access (TDMA) protocols to optimize the flow of real time traffic between set of fax/voice processing resources 654 and trunk interface 652.

Memory subsystem 653 is used to store information and programs needed by communications server 550. The functioning of memory subsystems in computer design are well known to those of ordinary skill in the art and thus will not be further discussed herein.

In an embodiment, trunk interface 652 is a trunk line interface, such as a T-1 or E-1 line, to switch 540 and can handle up to 24 channels of communications. Trunk line signaling is well known to those of ordinary skill in the art of telecommunication and thus will not be further discussed herein except as necessary for describing the invention.

Set of fax/voice processing resources 654 are made up of multiple fax/voice processing cards. Each of these processing cards contain processing units which are capable of receiving and transmitting facsimiles according to established protocols, and which are capable of digitizing voice or other audio data, also according to established protocols. In an embodiment, there are three fax/voice processing cards in set of fax/voice processing resources 654, each fax/voice processing card containing eight processing units capable of handling a channel from trunk interface 652. Thus, communications server 550 can communicate on twenty-four channels concurrently.

The storage of destination addresses on both circuit switched network 530 and WAN 580 is controlled by a database located either on communications server 550 or on database server 595. Keeping this information separate from communications server 550 allows communications server 550 to be a resource that can be allocated on demand. Hence, a number of communications servers could be used, along with one or more database servers, to allow a fully redundant and scalable system. In addition, system management unit 597 monitors the status and connection of all the communication and database servers.

FIG. 7 is a flow diagram illustrating the operations of an embodiment of the present invention when a call originating from a source on the circuit switched network 530. For example, either telephone unit 510 or facsimile unit 520 can initiate the call.

In block 700, an incoming call signal is received by communications server 550 from switch 540. The incoming call signal is initiated by telephone unit 510 or facsimile unit 520 over circuit switched network 530 and is routed to communications server 550 via switch 540. Communications server 550 detects the incoming call signal using trunk interface 652. Operation would continue with block 702.

Continuing with block 702, trunk line interface unit 652, in addition to receiving signals to indicate that there is an incoming call from switch 540, also receives signals indicating the circuit destination address of the incoming call. The destination address is captured by trunk interface 652 and is determined by trunk line signaling using mechanisms such as direct-inward-dial, or dual tone multifrequency (DTMF) tones.

Continuing with block 704, to determine whether or not to process the incoming call, processor 651 searches the list of inbound addresses contained in memory subsystem 653 for the destination address. If processor 651 finds the destination address in the inbound address list, processor 651 will then look up the account status for the user who owns the inbound address to determine if the account of that user is a valid user account. In an alternate embodiment, the validation is performed through the use of a database maintained by a separate entity such as database server 595. If the account is found to be inactive, communications server 651 will play a prepared message indicating that the number to which the incoming message was sent is an invalid account.

In block 706, once the validity of the user account has been established, processor 651 will attempt to allocate one fax/voice processing resource from set of fax/voice processing resources 654 and also determine the availability of other resources required for the receipt and processing of the incoming call. These other resources include the processing capacity of processor 651, the storage capacity of memory subsystem 653.

If it is determined that the appropriate resources are not available, then the call will be routed to a different communications server that is capable of allocating the necessary resources. The routing of calls is accomplished by trunk line signaling via switch 540 and is managed by system management unit 597.

Also, it should be noted that the call will only come from switch 540 to communications server 550 if there are no problems with the line. Otherwise the call will get routed to a different communications server. In an embodiment, fault detection and correction happens in one of two ways. First, on the telephone network side, switch 540 can be set up to independently route a call to another line if it is determined that one of the lines is bad. Second, if communications server 550 detects that the trunk line coming into trunk interface 652 is down, communications server 550 will notify system management unit 597 to reallocate the users for whom communications server 550 is responsible onto another communications server. Thus, system management unit 597 will transfer the duplicate user information contained in database server 595 into a different communications server.

In block 708, communications server 550 "answers" the incoming call by having trunk interface 652 go "off-hook" on the trunk line.

In block 710, if the fax/voice processing resource of set of fax/voice processing resources 654 which is processing the call determines that the incoming call is a fax transmission, then operation will continue with block 712. Otherwise, operation will continue with block 714. For example, if the call is a fax, a fax protocol is initiated, and the fax is received by one of the fax/voice processing resources of set of fax/voice processing resources 654. If the call is a voice call, the voice is recorded by one of the fax/voice processing resources of set of fax/voice processing resources 654.

In block 712, the fax/voice processing resource of set fax/voice processing resources 654 responsible for processing the incoming call will perform the fax transfer and store the incoming message as a temporary file in memory subsystem 653. In an embodiment, the incoming fax is saved into a file which follows the group 3 facsimile file format. Operation will then continue with block 716.

In block 714, where it is determined that the incoming message is an audio message, the fax/voice processing resource of set of fax/voice processing resources 654 allocated to process the call will initiate an audio recording of the incoming voice message. In an embodiment, the audio message is digitized and stored in memory subsystem 653 as a temporary file in a pulse code modulated format. After the incoming call has been digitized and stored, operation will then continue with block 716.

In block 716, trunk interface 652 will terminate the call. Operation will then continue with block 718.

In block 718, the incoming message, which has been stored as a temporary file in memory subsystem 653, is processed by processor 651. In an embodiment, the temporary file is processed according to the type of the incoming call. If the incoming call was a fax transmission, then the temporary file, which has been stored as a group 3 facsimile file, will be converted into a file which follows the tagged image file format (TIFF), or a format that is suitable for transmission over WAN 580. Optionally, the temporary fax file can also be compressed at this stage. If the incoming call was an audio message, then the temporary file would be compressed using a compression scheme such as the scheme defined in the global system for mobile-communications (GSM) standard. In alternate operations, compressing and other processing of the incoming message is performed as the same time the incoming message is being received and being placed in memory subsystem 653.

In block 720, communications server 550 uses the inbound address to determine the set of final destination addresses, which are destinations on WAN 580 (i.e., the packet switched network), to send the processed incoming message. Communications server 550 then sends an electronic mail (e-mail) with the processed incoming message as an attachment to all the destinations in the set of final destination addresses.

For example, the e-mail containing the attachment is transferred to, and stored in, a server such as mail server 560, The e-mail is then retrieved by client 590 whenever the user wishes. In an alternate embodiment, client 590 can retrieve the e-mail directly from communications server 550, without the storing operation of mail server 560.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

The invention claimed is:

1. A system for message delivery comprising:
   a server coupled to communicate with a plurality of first outbound resources and a database server, over an internal packet-switched data network, the database server containing account information on customers, the server implements a router-filter and a message storage area,
   the message storage area to store messages received from customers over an external packet-switched data network,
   the router-filter to find an active message in the message storage area, validate said active message by accessing the account information, and determine to which of the plurality of first outbound resources to assign said active message,
   each of the first resources to dial a destination fax number and send a fax.

2. The system of claim 1 wherein the internal data network is a private data network.

3. The system of claim 2 wherein the external data network is the Internet.

4. The system of claim 3 wherein the messages are received from the customers via one of a mail transport protocol server and a hypertext transport protocol server on the Internet.

5. The system of claim 1 wherein the router-filter is to prioritize a plurality of messages in the message storage unit that are assigned to an outbound resource.

6. The system of claim 1 wherein the router-filter is to determine which of the plurality of first outbound resources to assign said message to, based on which resource offers the least cost of delivering said active message.

7. The system of claim 1 wherein the router-filter is to generate an error message that indicates an error in delivering said active message as reported by the outbound resource to which said active message was assigned.

8. The system of claim 1 further comprising:
   a plurality of second outbound resources each to convert an input message into a format capable of being played back to a telephone over a telephone network, wherein the router-filter is to determine to which of the first and second resources said active message is to be assigned, based on a message type matching a capability of one of a first resource and a second resource.

9. The system of claim 1 further comprising:
   a plurality of second outbound resources each to convert an input message into a format capable of being transmitted to a paging terminal over one of (1) a telephone network and (2) a paging gateway over an external packet-switched network, wherein the router-filter is to determine to which of the first and second resources said active message is to be assigned, based on a message type matching a capability of one of a first resource and second resource.

10. An article of manufacture for supporting a message delivery system, comprising:
    a machine accessible data storage device containing data that, when accessed by a machine, cause a server to communicate with a plurality of separate outbound resource servers and a database all in a private packet-switched data network, the server to store requests, received over an external packet switched data network, in a message storage area after verifying that the requests are from customers, and assign each of the requests to one of the outbound resource servers which converts data associated with said request into a format capable of being received by a fax machine over a telephone network, wherein each of the outbound resource servers, after having delivered the data associated with the request to its final destination, sends a receipt message to the server which is also stored in the message storage area.

11. The article of manufacture of claim 10 wherein the device includes further data which, when accessed, allows the server to receive the requests over the Internet.

12. The article of manufacture of claim 10 wherein the device includes further data which, when accessed, cause the server to determine which of the plurality of outbound resource servers to assign a request to, based on which outbound resource server offers the least cost of delivering the data associated with the request to its final destination.

13. The article of manufacture of claim 10 wherein the device includes further data which, when accessed, cause the server to prioritize a plurality of requests that are assigned to an outbound resource server.

14. The article of manufacture of claim 10 wherein the device includes further data which, when accessed, causes the server to generate an error message when the receipt message from one of the outbound resource servers indicates an error in delivering the data associated with the request.

15. The article of manufacture of claim 14 wherein the device includes further data which, when accessed, causes the server to send the error message to a sender of the request.

* * * * *